(12) United States Patent
Hasuka et al.

(10) Patent No.: US 7,884,872 B2
(45) Date of Patent: Feb. 8, 2011

(54) METHOD FOR DRIVING SOLID-STATE IMAGING APPARATUS AND SOLID-STATE IMAGING APPARATUS

(75) Inventors: Tsuyoshi Hasuka, Osaka (JP); Ryoichi Nagayoshi, Hyogo (JP); Keijirou Itakura, Osaka (JP); Izumi Shimizu, Kyoto (JP); Yoshiaki Kato, Shiga (JP)

(73) Assignee: Panasonic Corporation, Osaka (JP)

( * ) Notice: Subject to any disclaimer, the term of this patent is extended or adjusted under 35 U.S.C. 154(b) by 1138 days.

(21) Appl. No.: 11/483,746

(22) Filed: Jul. 10, 2006

(65) Prior Publication Data

US 2007/0023785 A1  Feb. 1, 2007

(30) Foreign Application Priority Data

Jul. 26, 2005  (JP) .............................. 2005-216295

(51) Int. Cl.
    *H04N 5/335* (2006.01)
(52) U.S. Cl. ..................................... 348/313
(58) Field of Classification Search ................. 348/313, 348/314; 257/214, 215
    See application file for complete search history.

(56) References Cited

FOREIGN PATENT DOCUMENTS

| JP | 61-021680 | 1/1986 |
|---|---|---|
| JP | 61-26375 | 2/1986 |
| JP | 7-284026 | 10/1995 |
| JP | 2001-275954 | 10/2001 |
| JP | 2002-135662 | 5/2002 |
| JP | 2004-104319 | 4/2004 |
| JP | 2005-086672 A | 3/2005 |
| JP | 2005086672 | * 3/2005 |
| JP | 2005-184362 | 7/2005 |

* cited by examiner

*Primary Examiner*—Jason Chan
*Assistant Examiner*—Joel Fosselman
(74) *Attorney, Agent, or Firm*—Hamre, Schumann, Mueller & Larson, P.C.

(57) ABSTRACT

A driving method is applied to a solid-state imaging apparatus having photoelectric conversion portions, transfer portion for reading out signal charges, and an excess charge draining portion for draining charges exceeding a saturation charge amount that is set by a reference voltage. One of driving modes is selected from a full pixel mode in which accumulated signal charges are detected individually for each pixel and a pixel mixing mode in which signal charges of a predetermined number of pixels are mixed to be detected. In the full pixel mode, the draining portion is supplied with the reference voltage having the same value during a charge accumulation period and a read transfer period for read transferring charges. In the pixel mixing mode, the draining portion is supplied with the reference voltage having a low level during the charge accumulation period and the reference voltage having a high level during the read transfer period. An appropriate driving for the pixel mixing mode can be performed by avoiding a limitation of a substrate voltage, without deteriorating the spectral characteristics, the sensitivity, nor the linearity.

13 Claims, 19 Drawing Sheets

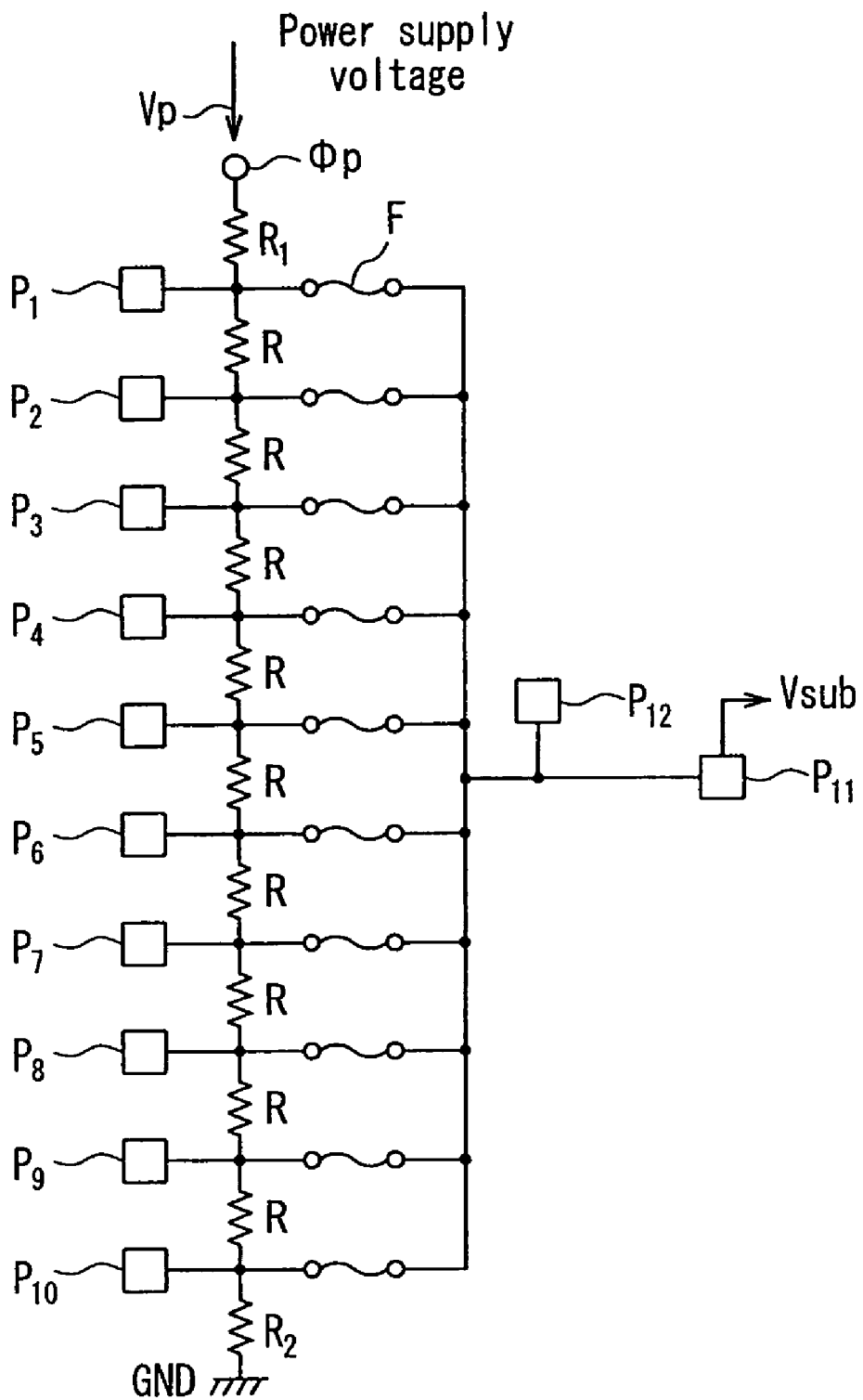
F I G. 4

METHOD FOR DRIVING SOLID-STATE IMAGING APPARATUS AND SOLID-STATE IMAGING APPARATUS

BACKGROUND OF THE INVENTION

1. Field of the Invention

The present invention relates to a method for driving a solid-state imaging apparatus that is configured so as to obtain two-dimensional image signals by reading out signal charges that have been accumulated in a plurality of photoelectric conversion portions arranged in matrix form, and the solid-state imaging apparatus.

2. Description of Related Art

A solid-state imaging apparatus constitutes an imaging portion of a video camera or digital camera, or an image recognition portion of a facsimile or image scanner. CCD (charge coupled device) image sensors are used widely as imaging elements.

A planar structure of a conventional solid-state imaging apparatus using a CCD image sensor is described with reference to a conceptual diagram in FIG. 19. Numeral 1 refers to a photodiode forming a photoelectric conversion portion, and a plurality of such photodiodes are arranged in matrix form. An imaging region 3 is formed such that vertical CCDs 2 are arranged between the columns of the photodiodes 1. Charges accumulated in the photodiodes 1 are read-transferred to the vertical CCDs 2, and transferred in parallel by the vertical CCDs 2 in the vertical direction toward a horizontal CCD 4.

Thus, signal charges corresponding to one scanning line are read-transferred sequentially from the plurality of vertical CCDs 2 to the horizontal CCD 4. Charges that have reached the horizontal CCD 4 are transferred in the horizontal direction, converted into a signal voltage by a charge detection portion 5, amplified by an output amplifier 6, and then derived as an imaging signal output OUT. A solid-state imaging element 7 constituted by the components described above is formed on an n-type substrate 75. The imaging output undergoes signal processing at a signal processing portion 30.

Transfer from the vertical CCDs 2 is driven by, for example, four phase transfer clocks φV1, φV2, φV3, and φV4 that are supplied from a timing generating circuit 8. Thereby, each portion corresponding to one scanning line in signal charges read out by the vertical CCDs 2 is transferred sequentially in the vertical direction during a horizontal blanking period. Transfer from the horizontal CCD 4 is driven by, for example, two phase horizontal transfer clocks φH1 and φH2. Thereby, signal charges corresponding to one scanning line are transferred sequentially in the horizontal direction during a horizontal scanning period after the horizontal blanking period.

The n-type substrate 75 is grounded via a resistor 11, and a reference voltage generating circuit 9 is connected via a diode 10 at the node between the n-type substrate 75 and the resistor 11. A reference voltage generated by the reference voltage generating circuit 9 is applied as a substrate voltage Vsub to the n-type substrate 75. As described later, the substrate voltage Vsub is a voltage that is applied in order to determine the saturation of signal charges accumulated in the photodiodes 1.

Considering the unevenness in the height between potential barriers formed by the substrate voltage Vsub, due to manufacturing differences of CCD image sensors, the reference voltage is set to an optimum value for each of the elements (chips).

On the other hand, in CCD image sensors capable of an electronic shutter operation, a shutter pulse SP is generated by the timing generating circuit 8, the DC component of the shutter pulse SP is cut by a capacitor 12, and then the obtained pulse is applied to the n-type substrate 75. At that time, the low level of the shutter pulse SP is clamped by the diode 10 to the DC level of the reference voltage (see JP H07-284026A, for example).

FIG. 20 shows a cross-sectional view of the element taken along the line A-A in FIG. 19. A p-well region 17 is formed on the upper portion of the n-type substrate 75, and the photodiode 1 and a vertical CCD channel 2a are formed in the p-well region 17. An electrode 18 serving as a transfer electrode for the vertical CCD and as an electrode for controlling read transfer of signal charges from the photodiode 1 is formed thereon. Numeral 19 refers to an element separation region.

The thus configured element is driven by a pulse with three values, and signal charges are read-transferred from the photodiode 1 via a transfer gate region 24 to the vertical CCD channel 2a when the highest voltage is applied.

An operation for suppressing blooming in this element is described with reference to FIG. 21 showing the potential distribution along the line B-C-D in FIG. 20. The regions in FIG. 20 are shown with the same reference numbers as those of their corresponding photodiode 1, transfer gate region 24, vertical CCD channel 2a, p-well region 17, and n-type substrate 75.

The substrate voltage Vsub is applied between the p-well region 17 and the n-type substrate 75, and thus the p-well region 17 under the photodiode 1 joined with a pn junction is depleted, and a potential barrier is formed in the potential distribution indicated by the solid line.

Furthermore, the potential indicated by the solid line of the transfer gate region 24 shows a state in which signal charges are not read-transferred. When signal charges are read-transferred, the potential changes into one as indicated by the broken line. When the potential of the transfer gate region 24 changes into one as indicated by the broken line, charges of the photodiode 1 are read-transferred to the vertical CCD channel 2a, so that the photodiode 1 is depleted as indicated by a potential 25a.

When a transfer period ends and an accumulation period is started, the potential well of the photodiode 1 becomes shallower as indicated by a potential 25b as charges are accumulated by incident light. When the potential 25b becomes lower than a potential 26a of the p-well region 17 in the potential distribution indicated by the solid line, excess charges pass through the p-well region 17 to be drained to the n-type substrate 75.

When charges are accumulated in the photodiode 1 in this manner in an amount exceeding the saturation charge amount that is determined by the potential barrier of the p-well region 17, excess charges are drained to the n-type substrate 75, and thus blooming is suppressed. When the substrate voltage Vsub is made high, the potential distribution changes into one as indicated by the broken line, and the saturation charge amount indicated by a potential 26b of the p-well region 17 is set to a small value. It is possible to obtain a blooming suppression effect that fits the characteristics of the element by setting the substrate voltage Vsub as appropriate.

However, this method for suppressing blooming has the following problem. During the periods in which signal charges are read-transferred by setting the potential of the transfer gate region 24 shown in FIG. 21 to the potential indicated by the broken line, charges generated in the photodiode 1 are accumulated in the vertical CCD channel 2a, the transfer gate region 24, and the photodiode 1 until the potential 25b based on the accumulated charges reaches the charge amount that corresponds to a potential lower than the potential 26a of the p-well region 17. However, if the potential of a barrier of an adjacent region within the vertical CCD channel 2a is higher than the potential 26a, then charges flow into the adjacent region within the vertical CCD channel 2a before excess charges flow into the n-type substrate 75. More specifically, during the periods in which signal charges are read-transferred from the photodiode 1, the blooming suppression effect is not practically achieved.

In order to achieve the blooming suppression effect even during the charge transfer periods, JP S61-26375A disclosed a configuration in which the n-type substrate 75 is given potentials that are different from each other between the periods to accumulate charges in the photodiode and the periods to read transfer charges. More specifically, the potential of the p-well region 17 is set to the low level potential 26a as in conventional cases during most of the signal charge accumulation periods, and is set to the high level potential 26b during the transfer periods. Thus, during the read transfer periods, charges that correspond to a potential shallower (lower) than the potential 26b for draining excess charges are not accumulated in the photodiode 1 but drained to the n-type substrate 75, and thus the blooming suppression effect is achieved. However, it is necessary that the potential of the barrier of the adjacent region of the vertical CCD 2 is lower than the potential 26b.

Furthermore, for CCDs having a large number of pixels used for digital cameras or other devices, there are a full pixel mode (such as still image mode) in which image data is created by individually detecting accumulated charges of all pixels, and a pixel mixing mode (such as monitor mode and moving image mode) in which information of thinned-out lines is added, and thus the information amount is reduced, so that the frame rate is increased.

In the pixel mixing mode, driving is performed such that signal charges of a predetermined number of pixels of the same color read out by the same vertical CCD are added and mixed, and then transferred to a charge detection portion, so that image signals of one line are obtained for every predetermined interval in the vertical direction. In the pixel mixing mode, charges of a plurality of pixels are mixed, and thus the amount of charges added becomes large, so that it is necessary to restrict the amount of charges to be read-transferred so as not to exceed the transfer ability in a vertical or horizontal CCD.

For this reason, in the pixel mixing mode, control is performed such that the substrate voltage Vsub is made high, and thus charges accumulated in a photodiode are restricted, so that the amount of charges added is within a range in which transfer is not impeded. It is necessary to reduce the saturation charge amount by increasing the substrate voltage Vsub as the number of pixels whose charges are added becomes larger. However, in the element, there is a limitation regarding the voltage that can be set. More specifically, if the number of pixels whose charges are added is too large, then it is impossible to set the substrate voltage Vsub to its corresponding high voltage.

Furthermore, when control is performed such that an extremely small saturation charge amount with respect to the charge accumulating ability that is specific to the photodiode is obtained by applying a high substrate voltage Vsub during charge accumulation, the spectral characteristics and the sensitivity change and the linearity is deteriorated compared with those in a individual-transfer mode.

In the method described in JP S61-26375A, driving for the pixel mixing mode is not assumed, and thus only uniform suppression of blooming during the signal charge transfer periods is taken into consideration, and thus the method does not solve the above-described problem in driving for the pixel mixing mode.

SUMMARY OF THE INVENTION

Therefore, with the foregoing in mind, it is an object of the present invention to provide a solid-state imaging apparatus that can be driven in the pixel mixing mode while avoiding a limitation regarding a voltage that can be applied as a substrate voltage, without deteriorating the spectral characteristics, the sensitivity, nor the linearity.

A method according to the present invention is configured for driving a solid-state imaging apparatus that is provided with a plurality of photoelectric conversion portions for accumulating signal charges in accordance with an amount of incident light, a transfer portion for reading out signal charges that have been accumulated in the photoelectric conversion portions, and an excess charge draining portion for draining, from the photoelectric conversion portions, excess charges in an amount exceeding a saturation charge amount that is set by a reference voltage.

In order to solve the problem, the method according to the present invention includes: performing selectively one of a full pixel mode in which signal charges accumulated in the photoelectric conversion portions are detected individually for each pixel and a pixel mixing mode in which signal charges of a predetermined number of pixels are mixed to be detected; supplying the excess charge draining portion, in the full pixel mode, with the reference voltage having the same value during a charge accumulation period for accumulating charges in the photoelectric conversion portions and a read transfer period for read transferring charges by the transfer portion; and supplying the excess charge draining portion, in the pixel mixing mode, with the reference voltage having a low level during the charge accumulation period and with the reference voltage having a high level higher than the low level during the read transfer period.

A solid-state imaging apparatus according to the present invention includes: a plurality of photoelectric conversion portions for accumulating signal charges in accordance with an amount of incident light; a transfer portion for reading out signal charges that have been accumulated in the photoelectric conversion portions; an excess charge draining portion for draining, from the photoelectric conversion portions, excess charges in an amount exceeding a saturation charge amount that is set by a reference voltage; a first reference voltage supply portion for supplying the reference voltage to the excess charge draining portion; a second reference voltage supply portion for outputting the reference voltage that is to be supplied to the excess charge draining portion; a timing generating circuit for supplying a control pulse upon receipt of a signal that is output from the second reference voltage supply portion, and a switch circuit for switching between the control pulse and a shutter pulse to supply the selected pulse to the excess charge draining portion.

BRIEF DESCRIPTION OF THE DRAWINGS

FIG. 4 is a circuit diagram showing one example of a first reference voltage generating circuit constituting the solid-state imaging apparatus.

DETAILED DESCRIPTION OF THE INVENTION

Figure 1:
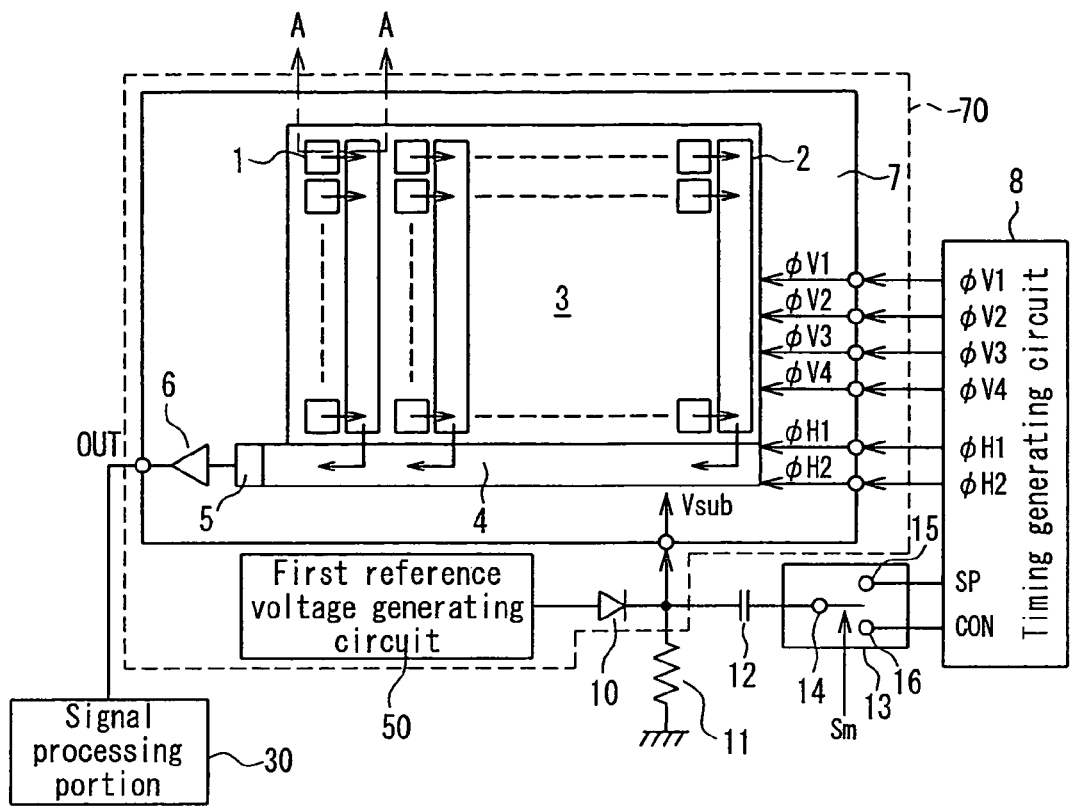
FIG. 1 is a conceptual diagram showing a planar structure of a solid-state imaging apparatus according to a first embodiment of the present invention.

According to the configuration of a solid-state imaging apparatus or a driving method thereof in the present invention, the excess charge draining portion is supplied with the respective reference voltages suitable for the charge accumulation period and the read transfer period, both in the driving modes such as the full pixel mode and the pixel mixing mode.

Therefore it is possible to accumulate charges, utilizing the charge accumulating ability that is specific to the photodiode, without deteriorating the spectral characteristics, the sensitivity nor the linearity during the charge accumulation periods, and it is possible to perform good driving for the pixel mixing mode by avoiding a limitation regarding a voltage that can be applied, by transferring charges in an amount reduced by draining charges that are more than necessary during the charge transfer periods.

In the method according to the present invention, it is possible that the reference voltage in the pixel mixing mode has a waveform obtained by superimposing a control pulse that is supplied from a timing generating circuit on a voltage generated by a first reference voltage generating circuit.

Furthermore, it is preferable that the reference voltage in the pixel mixing mode has a waveform obtained by superimposing a control pulse that is supplied from the timing generating circuit upon receipt of a signal output from a second reference voltage generating circuit on a voltage that is supplied from the first reference voltage generating circuit.

It is preferable that a first or second high level voltage is applied as the reference voltage during the read transfer period.

It is preferable that the first high level voltage has a waveform obtained by superimposing a control pulse that is supplied from a timing generating circuit upon receipt of a signal output from a second reference voltage generating circuit on a first voltage supplied from a first reference voltage generating circuit, the second high level voltage has a waveform obtained by superimposing on the first voltage the control pulse that is output from the timing generating circuit in response to a correction signal that is output from the second reference voltage generating circuit based on an image signal of the solid-state imaging apparatus so as to correspond to a state of the solid-state imaging apparatus, and the second high level voltage is a higher voltage than the first high level voltage.

It is possible that the second high level voltage is applied when an image of a high-brightness photographic subject is picked up in the pixel mixing mode.

It is preferable that a third high level voltage or a fourth high level voltage is applied respectively as the first or second high level voltage during the read transfer period in the pixel mixing mode, the third high level voltage is selected in a monitor mode, the fourth high level voltage is selected in a moving image mode, and the fourth high level voltage is a higher voltage than the third high level voltage.

It is preferable that the high level voltage is set to have a phase in which a rising thereof is at the same time as or delayed from a start of the read transfer period in the pixel mixing mode.

It is preferable that the high level voltage is set to have a phase in which a falling thereof is at the same time as or delayed from an end of the read transfer period in the pixel mixing mode.

In the apparatus according to the present invention, it is preferable that the apparatus further includes a buffer circuit between the second reference voltage supply portion and the timing generating circuit.

Furthermore, it is preferable that the apparatus further includes an A/D conversion portion and a parallel/serial conversion portion between the second reference voltage supply portion and the buffer circuit, wherein an A/D conversion and a parallel/serial conversion are performed on a signal that is output from the second reference voltage supply portion, and a serial/parallel conversion and a D/A conversion are performed at the timing generating circuit on a signal that is output from the buffer circuit.

Furthermore, it is preferable that the apparatus further includes a correction circuit for supplying a correction signal to the second reference voltage supply portion, wherein the correction circuit generates the correction signal based on a pixel signal read out from the photoelectric conversion portions.

It is possible that the excess charge draining portion is a semiconductor substrate that is provided with the photoelectric conversion portions and the transfer portion.

Hereinafter, a solid-state imaging apparatus and a driving method thereof in embodiments of the present invention are described specifically with reference to the drawings.

First Embodiment

Figure 19:
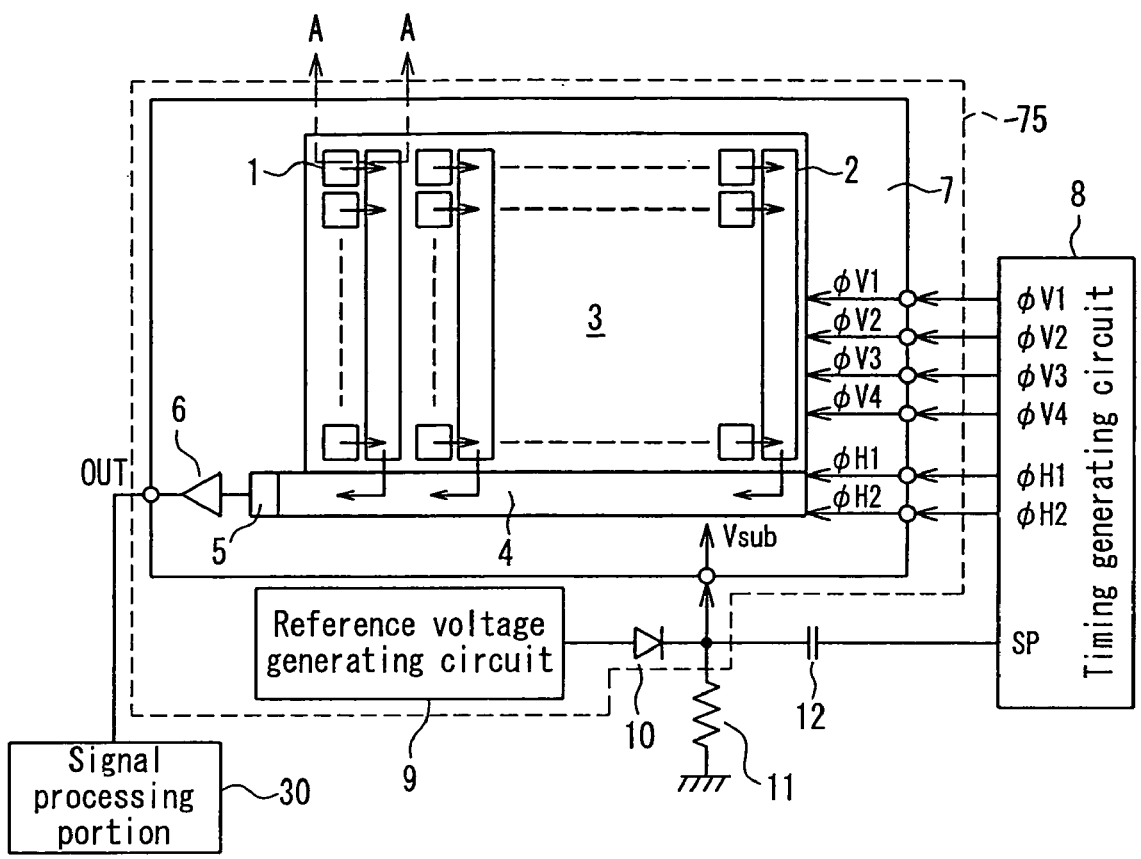
FIG. 19 is a conceptual diagram showing a planar structure of a solid-state imaging apparatus of a conventional example.
Figure 20:
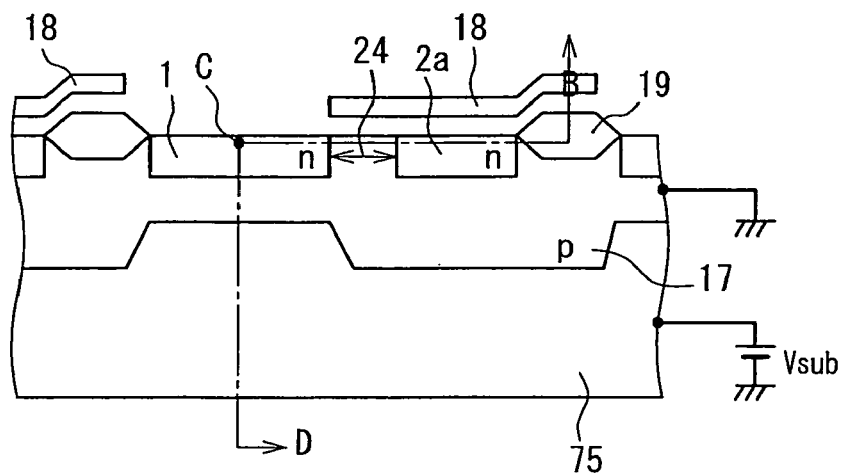
FIG. 20 is a cross-sectional view, taken along the line A-A' in FIG. 19, showing the structure in the vicinity of a photodiode in the solid-state imaging apparatus of the conventional example.

FIG. 1 is a conceptual diagram showing a planar structure of a solid-state imaging apparatus in a first embodiment. The basic structure is similar to that of the solid-state imaging apparatus shown in FIG. 19, and thus similar elements are denoted by the same reference numerals instead of describing them specifically. Furthermore, the cross-sectional structure of the element is similar to that in the conventional example shown in FIG. 20, and the potential distribution in the vicinity of a photodiode 1 is similar to that in FIG. 21, so that this embodiment is described also with reference to FIGS. 20 and 21.

As the driving modes, the solid-state imaging apparatus according to this embodiment is provided with the full pixel mode and the pixel mixing mode as described above. In order to control the saturation charge amount in the photodiodes 1 in accordance with the driving modes by varying the substrate voltage Vsub that is applied to an n-type substrate 70, a switch circuit 13 is connected between a timing generating circuit 8 and a capacitor 12. As a pulse voltage that is applied to the n-type substrate 70, the timing generating circuit 8 supplies a control pulse CON in addition to the shutter pulse SP. More specifically, this control pulse CON is a pulse corresponding to a high level reference voltage during a read transfer period in the pixel mixing mode.

The switch circuit 13 selectively switches between a terminal 15 from which the shutter pulse SP is supplied and a terminal 16 from which the control pulse CON is supplied, and connects the terminal to a terminal 14 that is connected to the capacitor 12. Thus, via the capacitor 12, either one of the shutter pulse SP and the control pulse CON is superimposed on the reference voltage, and applied to the n-type substrate 70 as the substrate voltage Vsub.

Furthermore, in this embodiment, the photodiodes 1, vertical CCDs 2, an imaging region 3, a horizontal CCD 4, a charge detection portion 5, an output amplifier 6, a first reference voltage generating circuit 50, and a diode 10 are provided on the same semiconductor substrate chip constituted by the n-type substrate 70.

Figure 21:
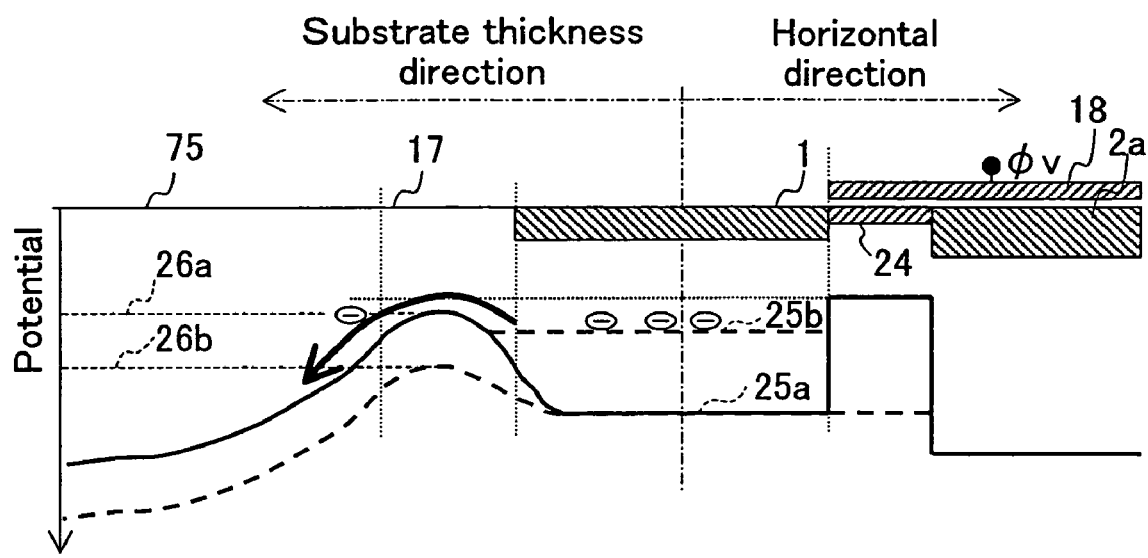
FIG. 21 is a diagram showing the potential distribution in the portions in the vicinity of the photodiode in FIG. 19.

The substrate voltage Vsub functions as the reference voltage for controlling the saturation charge amount in the photodiodes 1 as shown in FIG. 21. The selection made by the switch circuit 13 is switched by a mode selecting signal Sm that is supplied in accordance with a selection made by a driving mode selecting portion (not shown). When the driving mode is the pixel mixing mode, the control pulse CON is superimposed on the reference voltage that is supplied by the first reference voltage generating circuit 50 to the n-type substrate 70.

Figure 2:
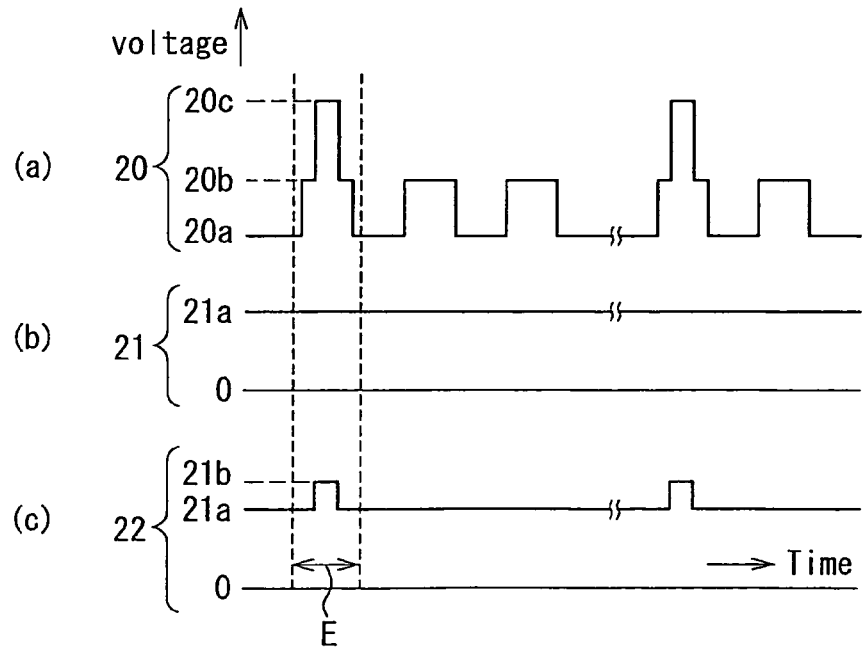
FIG. 2 is a waveform diagram showing pulse waveforms for driving the solid-state imaging apparatus.

FIG. 2 shows an example of the drive pulses in this embodiment. A clock pulse 20 shown in FIG. 2(a) is applied to an electrode 18 (see FIG. 20) serving as a transfer electrode for the vertical CCD 2 and as an electrode for controlling read transfer of signal charges from the photodiode 1. Charges are read-transferred inside the vertical CCD 2 by applying voltages 20a and 20b in alternation. The period in which a voltage 20c is applied is the read transfer period. This point is as in the conventional cases.

FIG. 2(b) shows a substrate voltage 21 that is applied to the n-type substrate 70 in the full pixel mode. A voltage 21a corresponds to the reference voltage that is supplied from the first reference voltage generating circuit 50, and is constant throughout the charge accumulation periods and the charge transfer periods. Herein, the shutter pulse SP that is supplied from the timing generating circuit 8 via the switch circuit 13 is not shown in the diagrams for the sake of simplicity. The voltage 21a corresponds to a threshold value for draining excess charges shown in FIG. 21, that is, a potential 26a that defines the saturation charge amount. More specifically, when the voltage 21a is applied to the n-type substrate 70, the potential barrier in a p-well region 17 is set to the potential 26a. In this manner, in the fill pixel mode, the low potential 26a that is constant throughout the charge accumulation periods and the charge transfer periods shown in FIG. 21 defines the saturation charge amount.

FIG. 2(c) shows a substrate voltage 22 that is applied to the n-type substrate 70 in the pixel mixing mode. A voltage 21b corresponds to the control pulse CON that is supplied from the timing generating circuit 8. More specifically, the substrate voltage 22 has the waveform obtained by superimposing the control pulse CON on the reference voltage that is supplied from the first reference voltage generating circuit 50. The substrate voltage 22 serves as the high level voltage 21b in correspondence with the read transfer period in the clock pulse 20, and serves as the low level voltage 21a during all other periods. The voltage 21b corresponds to a potential 26b that defines the saturation charge amount shown in FIG. 21.

In this manner, the saturation charge amount in the pixel mixing mode is set to be large during the charge accumulation periods and set to be small during the read transfer periods. Accordingly, it is possible to accumulate charges, utilizing the charge accumulating ability that is specific to the photodiode 1, without deteriorating the spectral characteristics, the sensitivity nor the linearity during the charge accumulation periods. Furthermore, it is possible to perform good driving for the pixel mixing mode by avoiding a limitation regarding a voltage that can be applied, by transferring charges in an amount reduced by draining excess charges during the read transfer periods.

Figure 3:
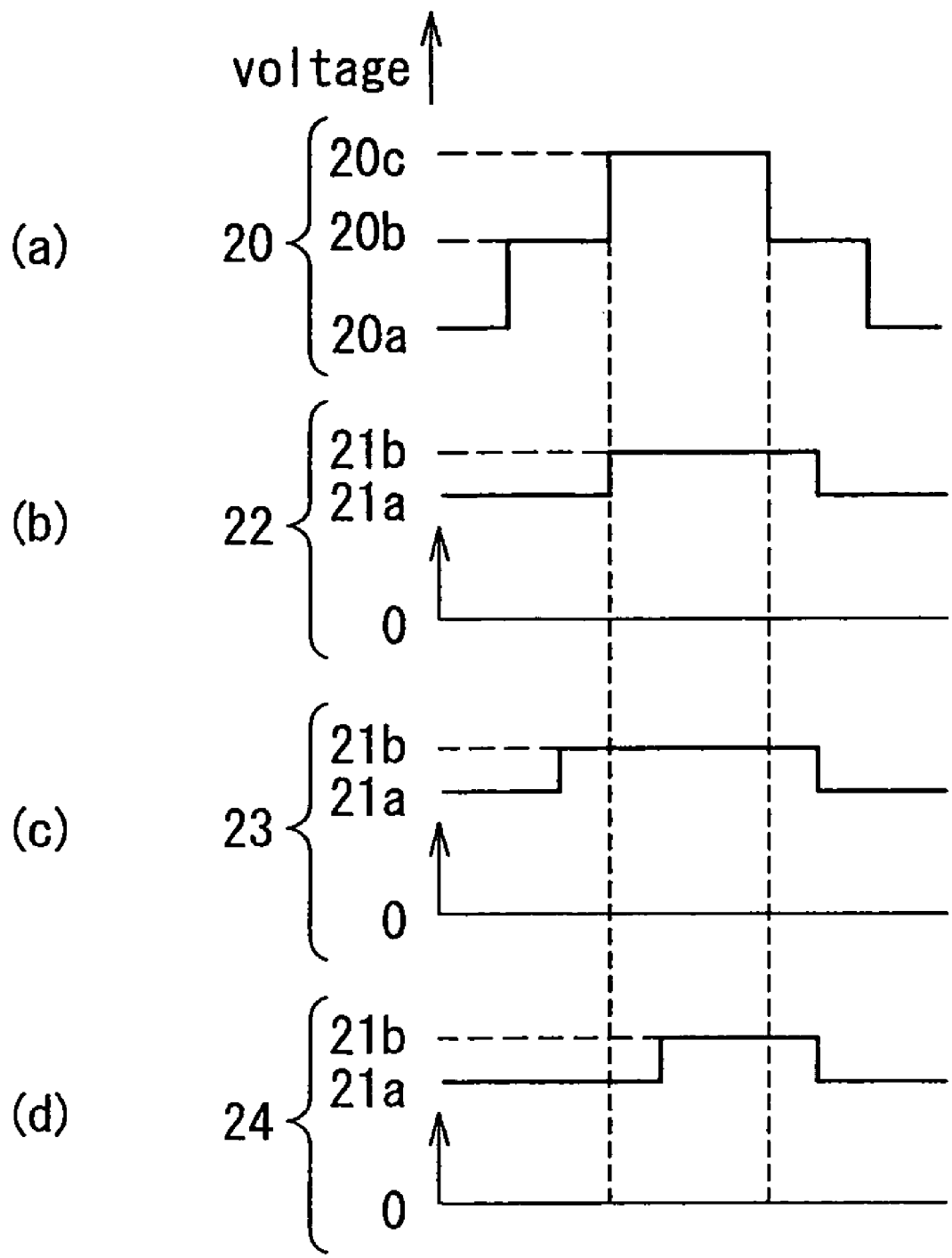
FIG. 3 is a waveform diagram showing in detail the pulse waveforms.

Next, the phase relationship between the clock pulse 20 in FIG. 2(a) and the high level voltage 21b in the substrate voltage 22 in FIG. 2(c) is described with reference to FIG. 3. FIGS. 3(a) and (b) schematically show enlarged views, in a period E, of the clock pulse 20 in FIG. 2(a) and the substrate voltage 22 in FIG. 2(c). Furthermore, FIGS. 3(c) and (d) show other examples of the substrate voltage 22.

The period of the voltage 21b in the substrate voltage 22 shown in FIG. 3(b) is overlapped with the period of the voltage 20a in the clock pulse 20 shown in FIG. 3(a). More specifically, the low level voltage 21a similar to that in conventional cases is applied during most of the signal charge accumulation periods, and the high level voltage 21b is applied during the transfer periods. Accordingly, charges that correspond to potentials shallower (lower) than the potential 26b for draining excess charges in FIG. 21 are not accumulated in the photodiode 1 but drained to the n-type substrate 70.

It is preferable that in the phase of the high level voltage 21b, the rising is at the same time as the rising of the voltage 20c in the clock pulse 20 in FIG. 3(a), that is, the start of the transfer period. However, the effect of draining excess charges is lowered slightly and the ability to control the signal amount is lowered. Furthermore, a slight delay as shown in a control pulse 24 in FIG. 3(d) is acceptable although the ability to control the signal amount is lowered.

Furthermore, when the high level voltage 21b is applied to the n-type substrate 70 before the transfer period as shown in FIG. 3(c), signal charges that have been accumulated in the photodiode 1 are drained to the level of the potential 26b in FIG. 21, and thus the dynamic range of the photodiode 1 is lowered, but the ability to control the signal amount is improved.

It is possible that in the phase of the high level voltage 21b that is applied to the n-type substrate 70, the falling is at the same time as an end of the transfer period, but a slight delay as shown in FIG. 3(b) to (d) is better because the synchronous control becomes easy.

In the description above, an example was shown in which only a single voltage is applied as the substrate voltage Vsub that is applied during the read transfer periods in the pixel mixing mode, but it is also possible to vary the substrate voltage Vsub that is applied during the read transfer periods in accordance with the number of pixels whose charges are mixed, so as to set an optimum saturation charge amount case by case.

For example, digital cameras are provided with a monitor mode and a moving image mode as the pixel mixing mode in addition to a still image mode, which is the full pixel mode. Charges of two pixels are mixed in the monitor mode, and charges of nine pixels are mixed in the moving image mode. In order to set the saturation charge amount as appropriate in the still image mode, a DC of 4 V is applied as the substrate voltage Vsub.

On the other hand, in the pixel mixing mode, in order to limit the amount of charges mixed within the transfer ability, it is necessary to apply a DC voltage of 6 V as the substrate voltage Vsub in the monitor mode, and to apply a DC voltage of 14 V as the substrate voltage Vsub in the moving image mode. Accordingly, in the pixel mixing mode to which this embodiment is applied, a voltage of 4 V is applied as the substrate voltage Vsub during the charge accumulation periods, and a substrate voltage Vsub of 6 V or 14 V is applied during the read transfer periods. Furthermore, in the pixel mixing mode, pixels that are mixed are not limited to pixels of the same color or pixels arranged side by side in the vertical direction, and signal charges may be mixed in various forms. This embodiment can be applied to any form in which pixels are mixed.

Furthermore, in the configuration shown in FIG. 1, a predetermined substrate voltage Vsub is applied by superimposing, using AC coupling, the control pulse CON on the reference voltage that is supplied from the first reference voltage generating circuit 50. More specifically, since AC coupling is used, a differential voltage between a desired substrate voltage Vsub and the reference voltage that is generated by the first reference voltage generating circuit 50 is supplied from the timing generating circuit 8 via the switch circuit 13. However, the configuration is not limited to this, and it is also possible to use a configuration in which the substrate voltage Vsub having a predetermined absolute value is applied using DC coupling, more specifically, in a configuration of FIG. 1, the substrate voltage Vsub may be applied directly from the switch circuit 13 without the capacitor 12.

With this configuration, in the configuration shown in FIG. 1, the low level of the substrate voltage Vsub is clamped to the DC level of the reference voltage, and thus this configuration is advantageous in that it is possible to change the substrate voltage Vsub in a state where a value of the reference voltage that is set to an optimum value for each chip is reflected, that is, it is possible to generate the reference voltage that is set to an optimum value for each chip in a case where a problem of an addition error is not caused because pixels are not added.

The first reference voltage generating circuit 50 can be configured as the example shown in FIG. 4. This circuit is a resistance dividing circuit in which a plurality of resistors are connected in series between an input terminal φp and the ground (GND). The power supply voltage is supplied from the input terminal φp. Pads P1 to P10 are formed at the respective nodes between the plurality of resistors R, and R1 and R2. Furthermore, the nodes are connected via respective fuses F to a pad P11 for supplying the reference voltage. In addition, a common pad P12 is formed at a point midway on a wire connecting the fuses and the pad P11. Each of the fuses F is cut by applying a current between the corresponding pad P1 to P10 and the common pad P12. By selectively cutting a fuse F that is no longer necessary, a predetermined voltage is generated, and the voltage is supplied from the pad P11. Accordingly, it is possible to set an optimum reference voltage compensating for manufacturing differences between chips.

Furthermore, in this embodiment, an example was described in which the charge draining portion is in the p-well structure, but this is not a limitation, and any structure may be used as long as it has a function to drain excess charges from a photodiode. For example, also in a so-called overflow drain structure in which an overflow control gate and an overflow control drain are provided adjacent to a photodiode, it is possible to obtain a similar effect by applying a control pulse to the overflow control gate.

Second Embodiment

Hereinafter, a solid-state imaging apparatus and a driving method thereof according to a second embodiment of the present invention are described with reference to the drawings.

Figure 5:
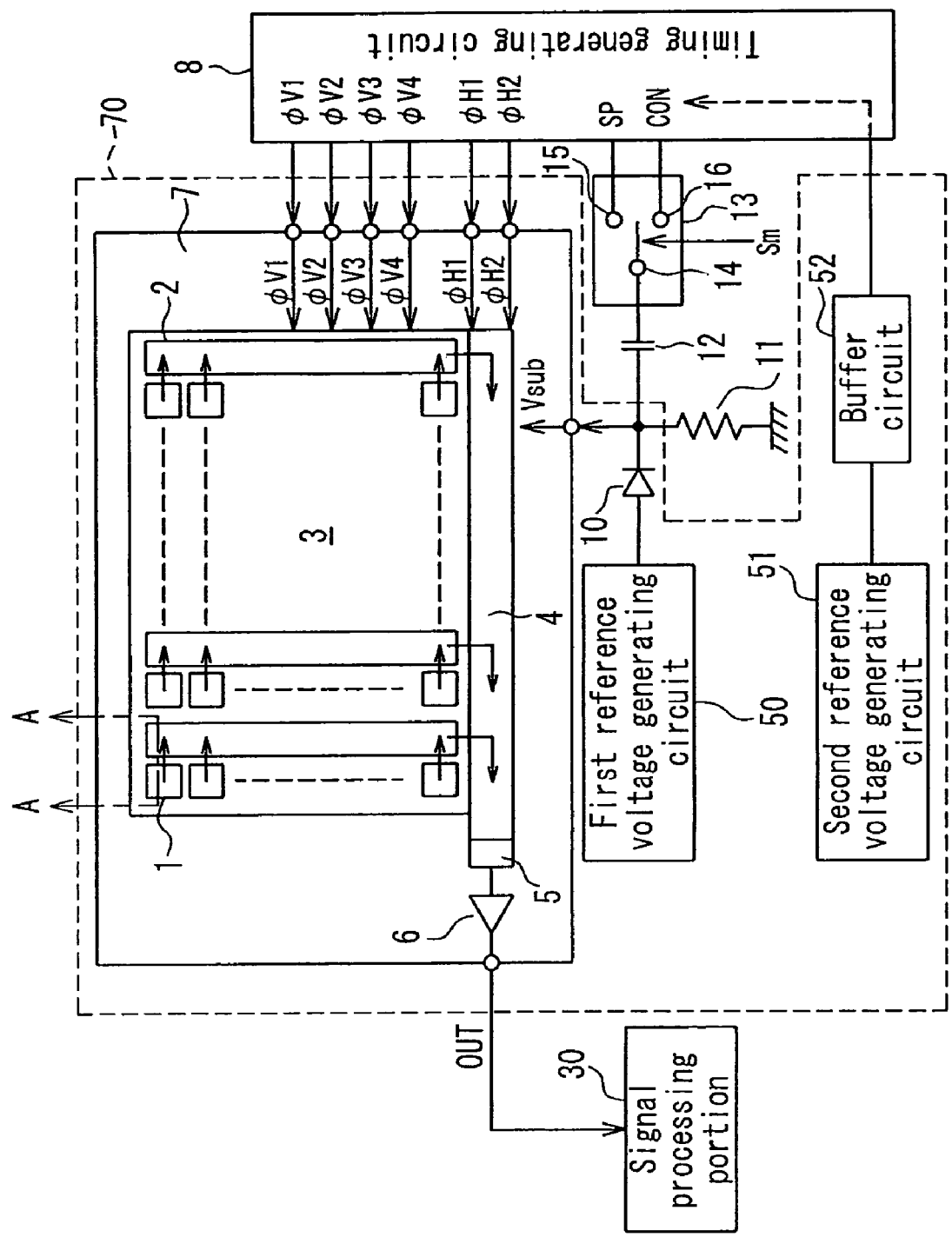
FIG. 5 is a conceptual diagram showing a planar structure of a solid-state imaging apparatus according to a second embodiment of the present invention.

FIG. 5 is a conceptual diagram showing a planar structure of a solid-state imaging apparatus according to this embodiment. The basic structure is similar to that of the solid-state imaging apparatus shown in FIG. 19, and thus similar components are denoted by the same reference numbers instead of describing them specifically. The cross-sectional structure of the element is similar to that in the conventional example shown in FIG. 20, and the potential distribution in the vicinity of a photodiode 1 is similar to that in FIG. 21, so that this embodiment is described also with reference to FIGS. 20 and 21.

As the driving modes, the solid-state imaging apparatus in this embodiment is provided with the full pixel mode and the pixel mixing mode. In order to control the saturation charge amount in the photodiodes 1 in accordance with the driving modes by varying the substrate voltage Vsub that is applied to an n-type substrate 70, a switch circuit 13 is connected between a timing generating circuit 8 and a capacitor 12.

As a pulse voltage that is applied to the n-type substrate 70, the timing generating circuit 8 supplies the control pulse CON in addition to the shutter pulse SP. This solid-state imaging apparatus is provided with a second reference voltage generating circuit 51 in addition to a first reference voltage generating circuit 50. The voltage value of the control pulse CON is determined by a signal that is output from the second reference voltage generating circuit 51. An output signal of the second reference voltage generating circuit 51 is supplied as a reference signal to the timing generating circuit 8 via a buffer circuit 52. The second reference voltage generating circuit 51 generates a reference voltage in a higher level than that of the first reference voltage generating circuit 50.

With this configuration, if necessary, it is possible to apply the substrate voltage Vsub that is higher than the high level substrate voltage Vsub applied during the ordinary read transfer periods, and it is possible to mix a larger number of pixels in the mixed mode while securing the best dynamic range for each chip, by reducing the charge signal amount. For example, it is possible to mix nine pixels in the first embodiment, whereas in this embodiment, it is possible to secure the dynamic range the same as or higher than that for nine-pixel mixing in the first embodiment even if 12 pixels, or 18 or more pixels are mixed.

The switch circuit 13 selectively switches between a terminal 15 from which the shutter pulse SP is supplied and a terminal 16 from which the control pulse CON is supplied, and connects the terminal to a terminal 14 that is connected to the capacitor 12. Thus, via the capacitor 12, either one of the shutter pulse SP and the control pulse CON is superimposed on the reference voltage, and applied to the n-type substrate 70 as the substrate voltage Vsub.

Furthermore, this embodiment is characterized in that the photodiodes 1, vertical CCDs 2, an imaging region 3, a horizontal CCD 4, a charge detection portion 5, an output amplifier 6, the first reference voltage generating circuit 50, and the second reference voltage generating circuit 51 are provided on the same semiconductor substrate chip constituted by the n-type substrate 70. With this configuration, it is possible to make the imaging apparatus smaller and consume less electricity.

However, when the second reference voltage generating circuit 51 is placed on the same chip as a solid-state imaging element 7, if the characteristics such as dark current of the solid-state imaging element 7 vary due to the heat distribution of the semiconductor substrate chip based on heat generated by the second reference voltage generating circuit 51 for example, then the second reference voltage generating circuit 51 may be provided in an external circuit. Even if the second reference voltage generating circuit 51 is provided in an external circuit, it is possible to apply the substrate voltage Vsub that is higher than the high level substrate voltage Vsub applied during the ordinary read transfer periods, and thus an effect of reducing the charge signal amount can be obtained.

The selection made by the switch circuit 13 is switched by a mode selecting signal Sm that is supplied in accordance with a selection made by a driving mode selecting portion (not shown). When the driving mode is the pixel mixing mode, the control pulse CON is superimposed on the reference voltage that is supplied by the first reference voltage generating circuit 50 and applied to the n-type substrate 70.

Figure 6:
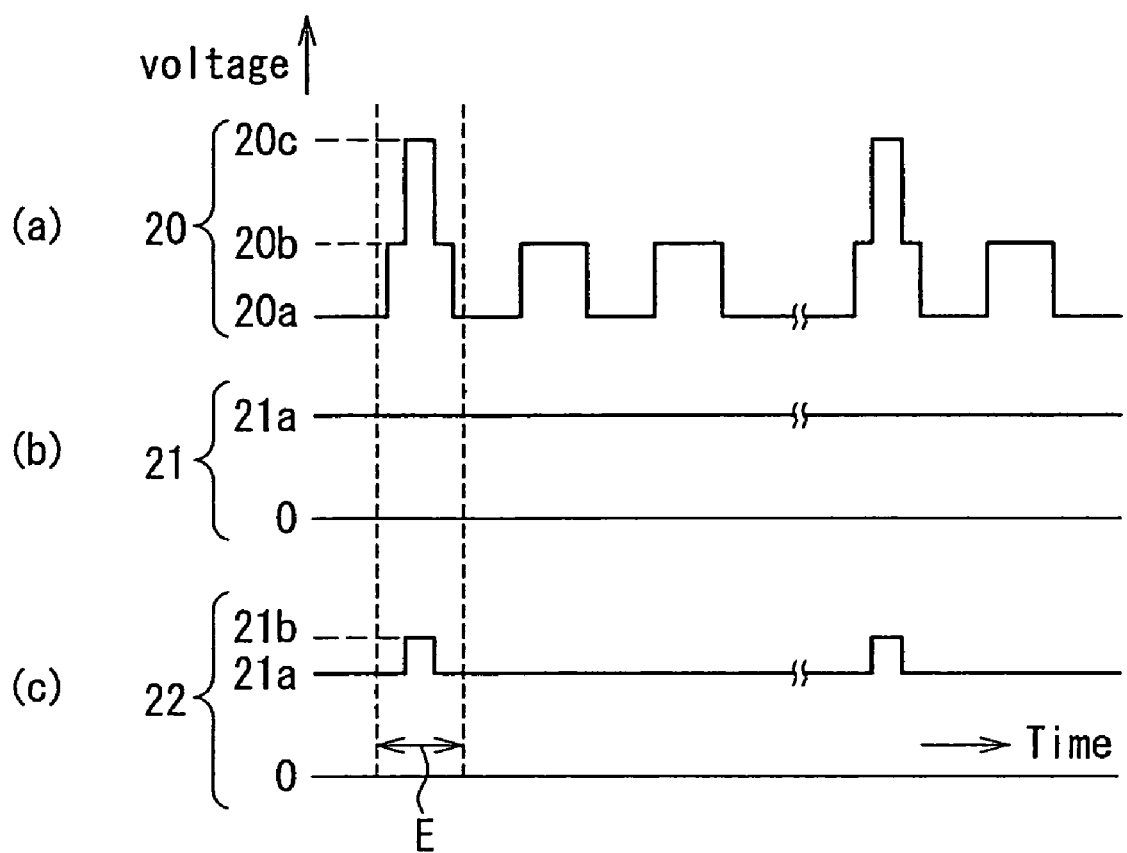
FIG. 6 is a waveform diagram showing pulse waveforms for driving the solid-state imaging apparatus.

FIG. 6 shows an example of the drive pulses in this embodiment. The waveforms of the drive pulses shown in FIG. 6 are substantially similar to those in the first embodiment shown in FIG. 1, and thus the description is not repeated. In this embodiment, the voltage value of a voltage 21b, shown in FIG. 6(c), corresponding to the control pulse CON that is supplied from the timing generating circuit 8 is determined by a signal that is output from the second reference voltage generating circuit 51.

In this manner, the saturation charge amount in the pixel mixing mode is set to be large during the charge accumulation periods and set to be small during the read transfer periods. Accordingly, it is possible to accumulate charges, utilizing the charge accumulating ability that is specific to the photodiode 1, without deteriorating the spectral characteristics, the sensitivity nor the linearity during the charge accumulation periods. Furthermore, it is possible to perform good driving for the pixel mixing mode by avoiding a limitation regarding a voltage that can be applied, by transferring charges in an amount reduced by draining excess charges during the read transfer periods.

Figure 7:
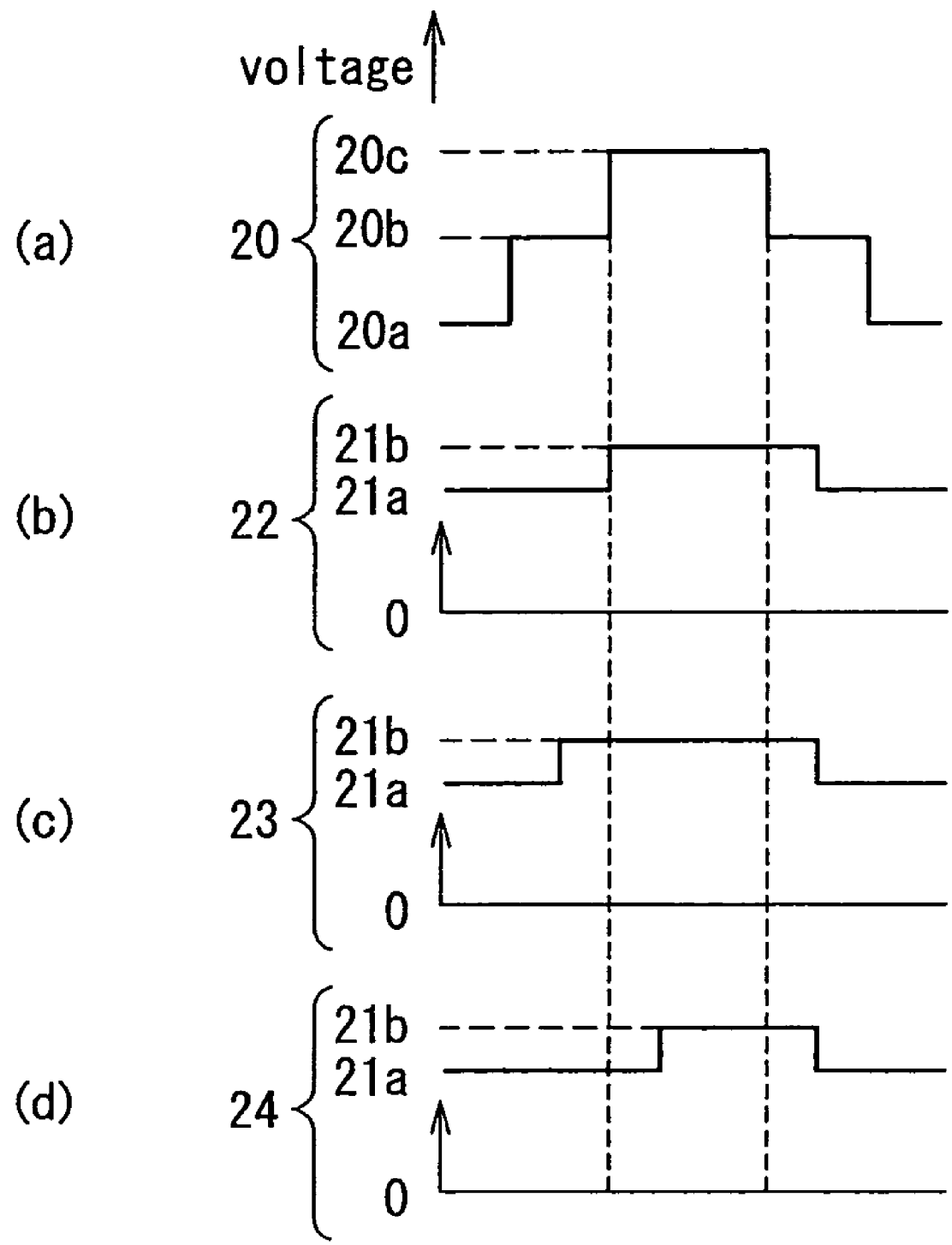
FIG. 7 is a waveform diagram showing in detail the pulse waveforms.
Figure 8:
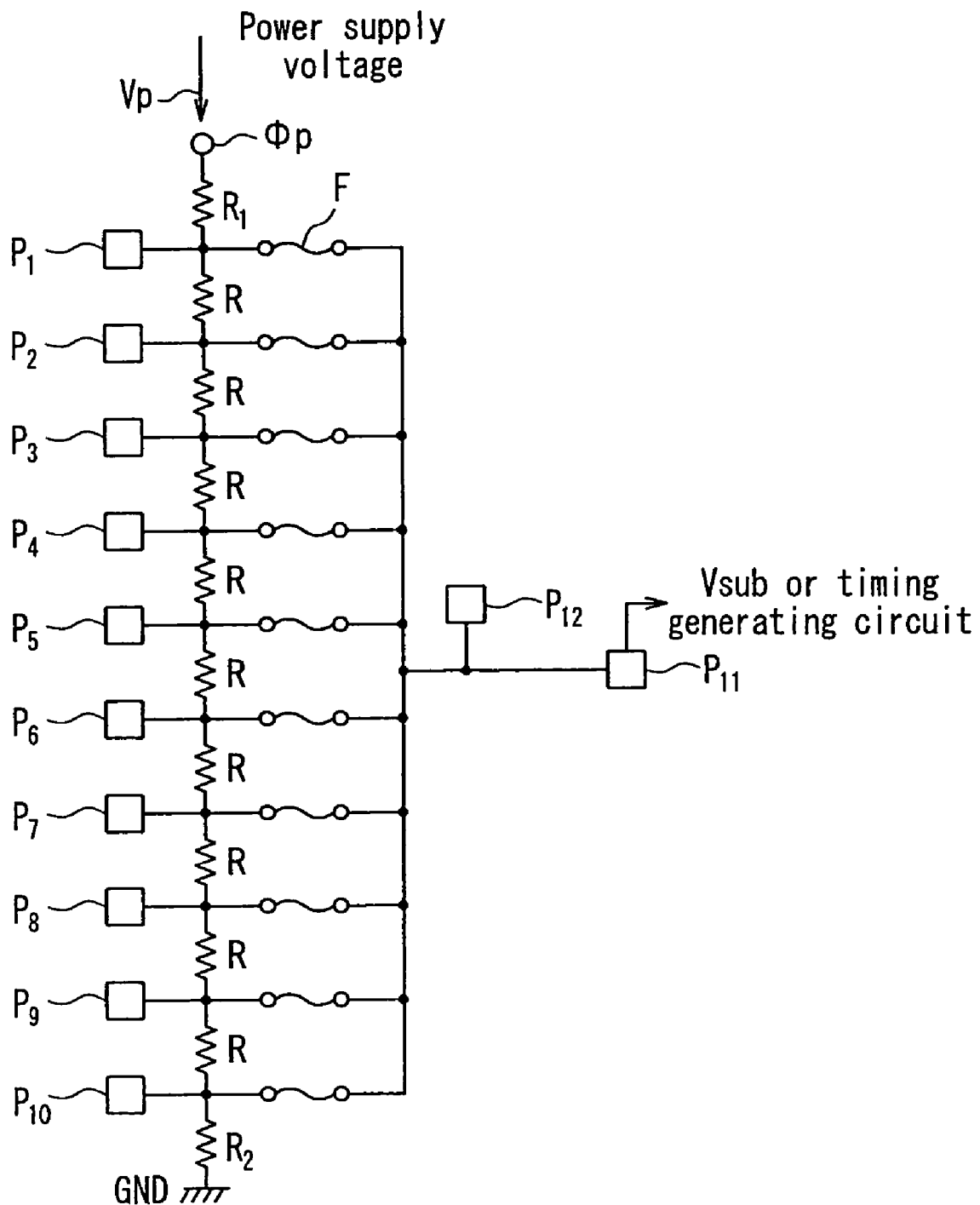
FIG. 8 is a circuit diagram showing one example of a first reference voltage generating circuit constituting the solid-state imaging apparatus.

Next, the phase relationship between a clock pulse 20 in FIG. 6(a) and the high level voltage 21b in a substrate voltage 22 in FIG. 6(c) is shown in FIG. 7. The phase relationship shown in FIG. 7 is substantially similar to those in the first embodiment shown in FIG. 2, and the description is not repeated. In this embodiment, the first reference voltage generating circuit 50 can be configured as the example shown in FIG. 8. This configuration of the first reference voltage generating circuit 50 is similar to that of the first reference voltage generating circuit 50 used in the first embodiment shown in FIG. 4, and thus the description is not repeated.

Figure 9:
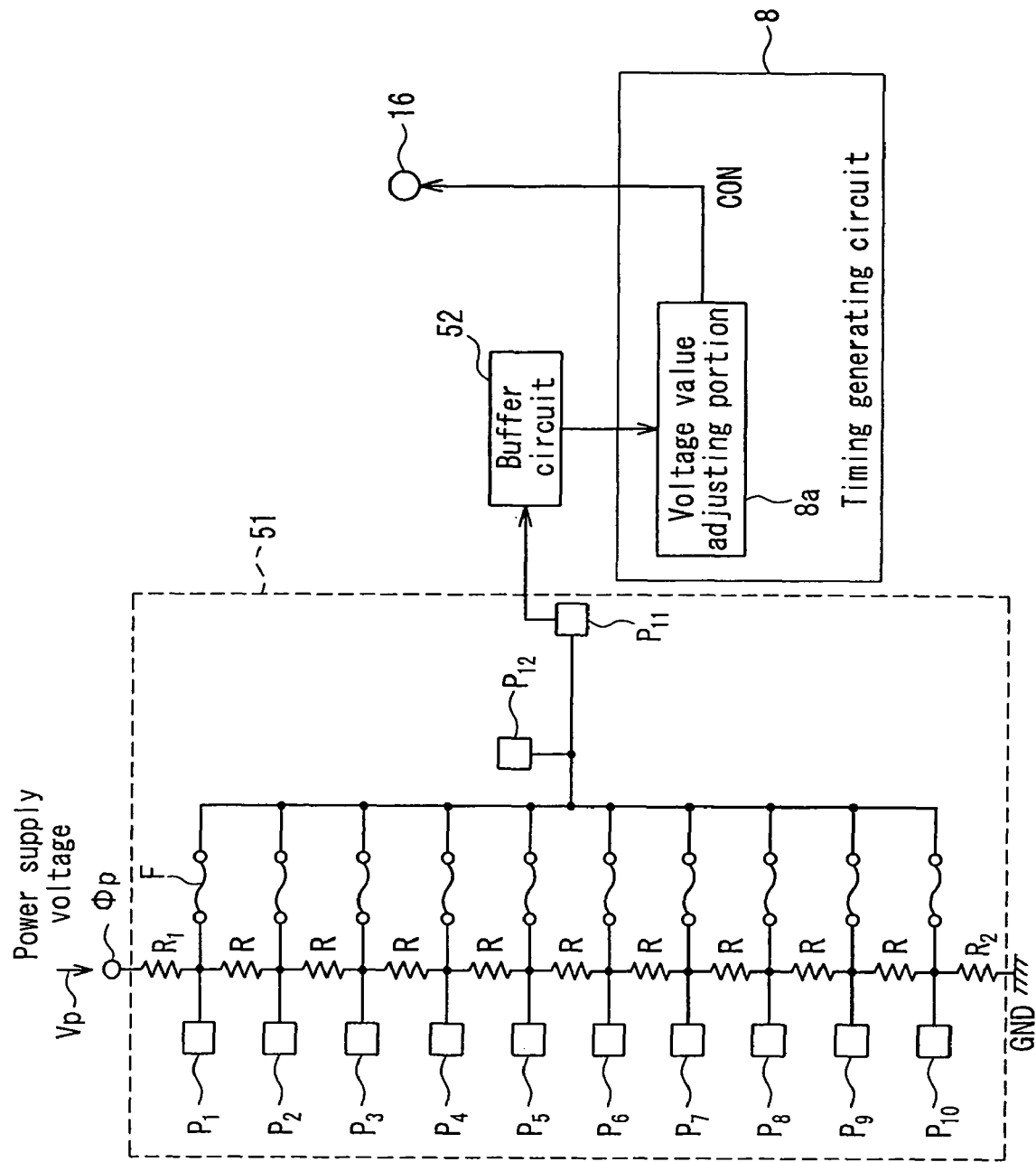
FIG. 9 is a diagram showing one example of a part of a second reference voltage generating circuit, a buffer circuit, and a timing generating circuit constituting the solid-state imaging apparatus.

The second reference voltage generating circuit 51, the buffer circuit 52, and the timing generating circuit 8 can be configured, for example, as shown in FIG. 9. It should be noted that the timing generating circuit 8 in FIG. 9 is partly shown with respect to the configuration for supplying a signal from the second reference voltage generating circuit 51 through the buffer circuit 52 to the terminal 16 as a control pulse.

In FIG. 9, the second reference voltage generating circuit 51 is provided with a resistance dividing circuit in which a plurality of resistors are connected in series between an input terminal φp and the ground (GND). The power supply voltage is supplied from the input terminal φp. Pads P1 to P10 are connected to the respective nodes between the plurality of resistors R, and R1 and R2. Furthermore, the nodes are connected via respective fuses F to a pad P11 for supplying the reference voltage. In addition, a common pad P12 is formed at a point midway on a wire connecting between the fuses F and the pad P11. Each of the fuses F is cut by applying a current between the corresponding pad P1 to P10 and the common pad P12. By selectively cutting a fuse F that is no longer necessary, a predetermined voltage is generated, and the voltage is supplied from the pad P11. Accordingly, it is possible to set an optimum reference voltage compensating for manufacturing differences between chips.

Signal voltage that has been output from the second reference voltage generating circuit 51 is supplied to the buffer circuit 52 in which impedance conversion is to be performed in order to drive the timing generating circuit 8. Furthermore, the signal voltage that has been output from the buffer circuit 52 is supplied to the timing generating circuit 8. In the internal portion of the timing generating circuit 8, the voltage is adjusted at a voltage value adjusting portion 8a, and then the voltage is output to the terminal 16 of the switch circuit 13 as the reference voltage after voltage adjustment.

With the configuration as in FIG. 9, it is possible to set the reference voltage so as to secure the best dynamic range based on manufacturing differences between chips.

Figure 10:
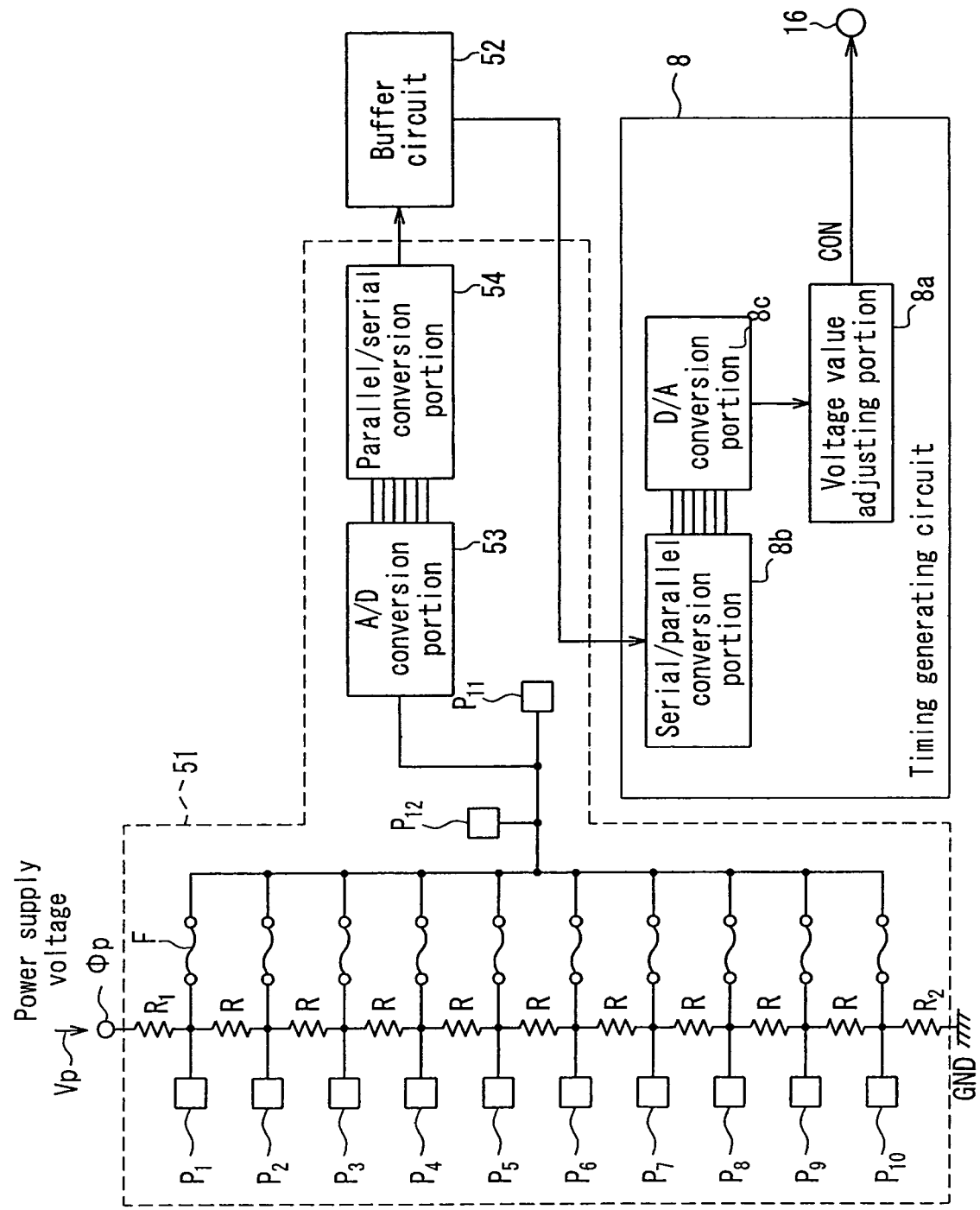
FIG. 10 is a diagram showing another example of a part of a second reference voltage generating circuit, a buffer circuit, and a timing generating circuit constituting the solid-state imaging apparatus.

Alternatively, as another configuration example, the second reference voltage generating circuit 51, the buffer circuit 52, and the timing generating circuit 8 can be configured as shown in FIG. 10. The timing generating circuit 8 in FIG. 10 is partly shown with respect to the configuration for supplying a signal from the second reference voltage generating circuit 51 through the buffer circuit 52 to the terminal 16 as a control pulse.

In FIG. 10, the second reference voltage generating circuit 51 is provided with a resistance dividing circuit in which a plurality of resistors are connected in series between an input terminal φp and the ground (GND). The power supply voltage is supplied from the input terminal φp. Pads P1 to P10 are formed at the respective nodes between the plurality of resistors R, and R1 and R2. Furthermore, the nodes are connected via respective fuses F to a pad P11 for supplying the reference voltage. In addition, a common pad P12 is formed at a point midway on a wire connecting between the fuses F and the pad P11. Each of the fuses F is cut by applying a current between the corresponding pad P1 to P10 and the common pad P12. By selectively cutting a fuse F that is no longer necessary, a predetermined voltage is generated, and the voltage is supplied from the pad P11.

Analog output that has been generated in this circuit is converted into a digital signal at an A/D conversion portion 53, and parallel data that has been output by the A/D conversion portion 53 is converted into serial data at a parallel/serial conversion portion 54. Furthermore, the signal pulse or signal pulse voltage that has been output from the second reference voltage generating circuit 51 and converted into serial data is supplied to the buffer circuit 52 in which impedance conversion is to be performed in order to drive the timing generating circuit 8. The signal pulse or signal pulse voltage that is digital serial data that has been output from the buffer circuit 52 is supplied to the timing generating circuit 8. In the timing generating circuit 8, the supplied signal pulse or signal pulse voltage is converted into parallel data at a serial/parallel conversion portion 8b, the obtained data is converted into an analog signal at a D/A conversion portion 8c, the voltage is adjusted at the voltage value adjusting portion 8a, then the voltage is output to the terminal 16 of the switch circuit 13 as the reference voltage after voltage adjustment.

With the configuration as in FIG. 10, it is possible to set the reference voltage so as to secure the best dynamic range based on manufacturing differences between chips as in the configuration in FIG. 9.

Compared with the configuration shown in FIG. 10, the circuits in the configuration shown in FIG. 9 are simpler, and thus this configuration is advantageous in that it is easy to make the imaging apparatus smaller. On the other hand, compared with the configuration shown in FIG. 9, the configuration shown in FIG. 10 is advantageous in that it is possible to achieve the solid-state imaging apparatus having excellent noise tolerance because the reference voltage is converted into a digital signal.

Furthermore, in this embodiment, an example was shown in which the control pulse CON is generated at the timing generating circuit 8, but it is also possible to use a configuration in which the control pulse CON is generated at a driver for supplying a CCD horizontal transfer pulse or vertical transfer pulse, or a signal processing portion 30 for processing a CCD output signal.

As described above, with the solid-state imaging apparatus and the driving method thereof according to the second embodiment of the present invention, if necessary, it is possible to apply the substrate voltage Vsub that is higher than the high level substrate voltage Vsub applied during the ordinary read transfer periods, and it is possible to mix a larger number of pixel signals while securing the best dynamic range for each chip, by reducing the charge signal amount.

For example, the first embodiment is related to an example in which charges in nine pixels are mixed, whereas in this embodiment, it is possible to secure the dynamic range the same as or higher than that for nine-pixel mixing in the first embodiment even if charges in 12 pixels, or 18 or more pixels are mixed.

A large number of pixels can be mixed in this manner because of the following reasons. First, in this embodiment, it is possible to accumulate charges, utilizing the charge accumulating ability that is specific to the photodiode, without deteriorating the spectral characteristics, the sensitivity nor the linearity during the charge accumulation periods. Further, it is possible to perform good driving for the pixel mixing mode by avoiding a limitation regarding a voltage that can be applied, by transferring charges in an amount reduced by draining excess charges during the read transfer periods.

Furthermore, it is possible to perform control properly when mixing signals of a plurality of pixels, by supplying a reference voltage that is suitable for the signal amount of single pixel and the amount of signals of the plurality of pixels added, from each of the first and second reference voltage generating circuits 50 and 51. Furthermore, the reference voltage can be adjusted to an optimum voltage for various photodiode characteristics of each solid-state imaging element 7.

More specifically, it is possible to secure the linearity characteristics to the maximum while sufficiently draining unnecessary charges. Thus because of the effect of the substrate voltage Vsub generated at the second reference voltage generating circuit 51, it is possible to secure the highest dynamic range by improving inconvenient characteristics that when the substrate voltage Vsub is set using the signal amount of single pixel as a reference, deterioration in the charge transfer is caused in mixing charges of pixels due to accumulation of setting errors of the substrate voltage Vsub.

Third Embodiment

Hereinafter, a solid-state imaging apparatus and a driving method thereof according to a third embodiment of the present invention are described with reference to the drawings.

Figure 11:
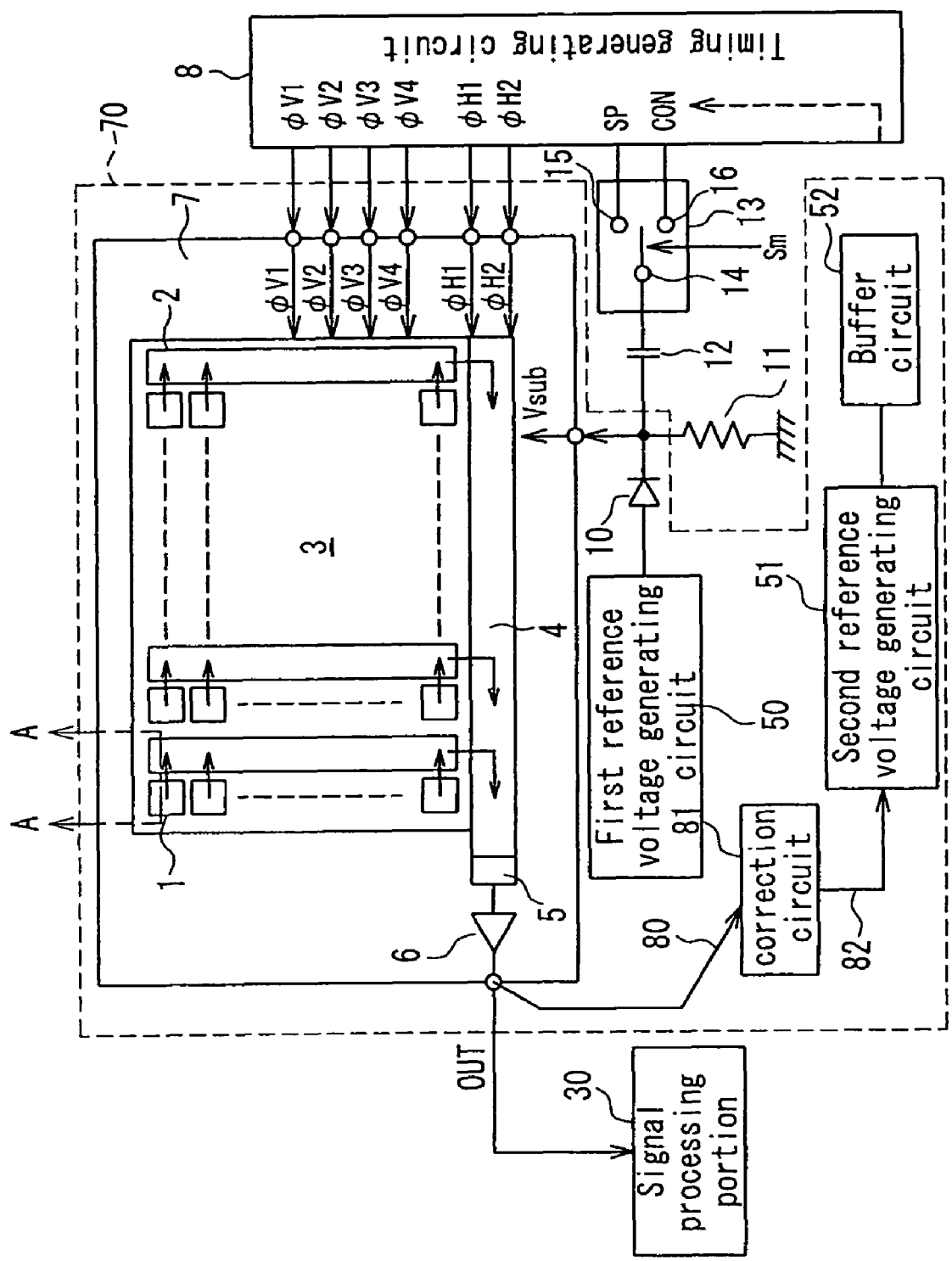
FIG. 11 is a conceptual diagram showing a planar structure of a solid-state imaging apparatus according to a third embodiment of the present invention.
Figure 18:
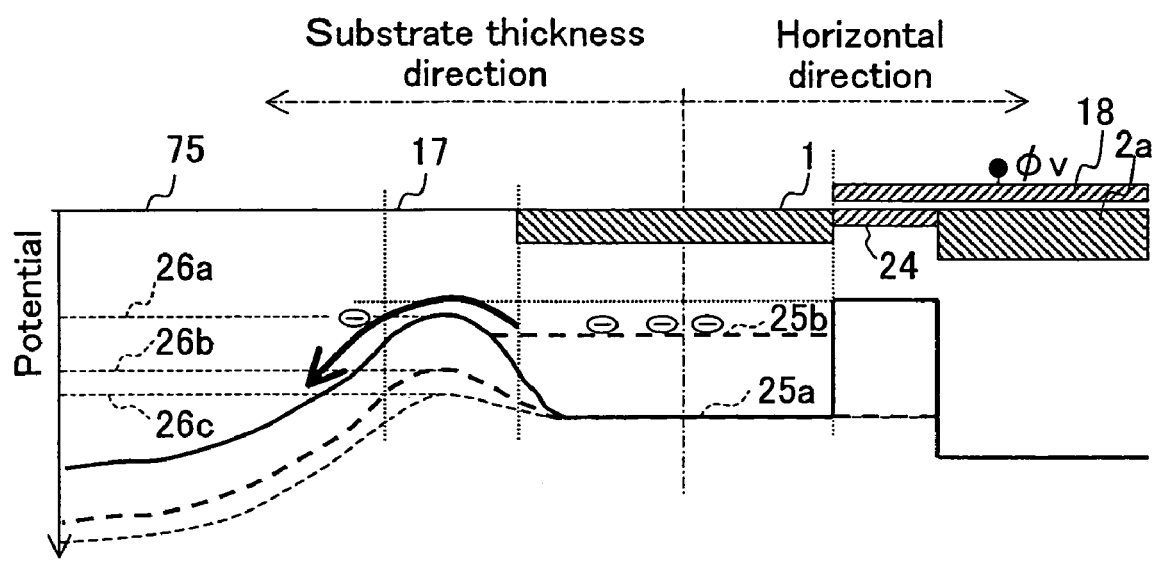
FIG. 18 is a diagram showing the potential distribution in the portions in the vicinity of a photodiode in the solid-state imaging apparatus.

FIG. 11 is a conceptual diagram showing a planar structure of a solid-state imaging apparatus in this embodiment. The basic structure is similar to that of the solid-state imaging apparatus shown in FIG. 19, and thus similar components are denoted by the same reference numbers instead of describing them specifically. Furthermore, the cross-sectional structure of the element is similar to that in the conventional example shown in FIG. 20. FIG. 18 shows the potential distribution in the vicinity of a photodiode 1 in this embodiment.

As the driving modes, the solid-state imaging apparatus in this embodiment is provided with the full pixel mode and the pixel mixing mode. In order to control the saturation charge amount in the photodiodes 1 in accordance with the driving modes by varying the substrate voltage Vsub that is applied to an n-type substrate 70, a switch circuit 13 is connected between a timing generating circuit 8 and a capacitor 12.

As a pulse voltage that is applied to the n-type substrate 70, the timing generating circuit 8 supplies the control pulse CON in addition to the shutter pulse SP. The voltage value of the control pulse CON is determined by a signal that is output from a second reference voltage generating circuit 51. A signal that is output from the second reference voltage generating circuit 51 is output as a reference signal via a buffer circuit 52 to the timing generating circuit 8. The second reference voltage generating circuit 51 is configured such that an output signal is corrected in accordance with imaging output of a solid-state imaging element 7, based on output from a correction circuit 81, and as a result, the substrate voltage Vsub is corrected as appropriate.

Figure 12:
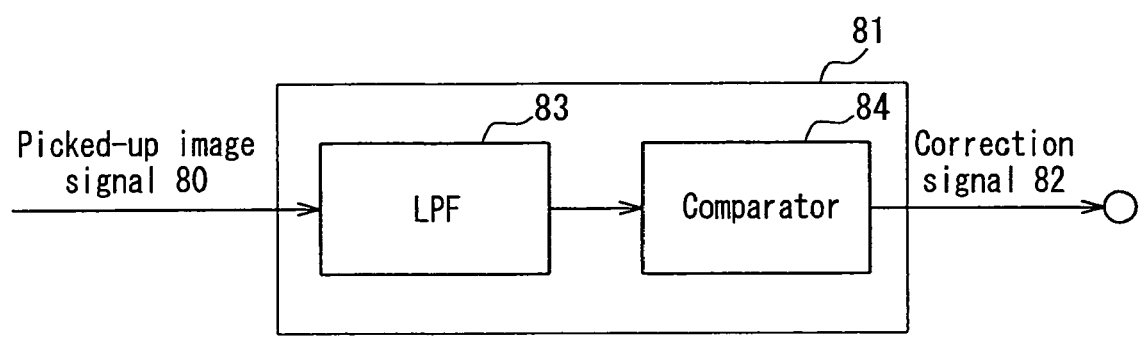
FIG. 12 is a diagram showing a correction circuit constituting the solid-state imaging apparatus.

The correction circuit 81 has, for example as shown in FIG. 12, a low-pass filter 83 and a comparator 84. An image signal 80 from an output amplifier 6 is input to the low-pass filter 83, and the DC component of the image signal 80 is extracted at the low-pass filter 83. The extracted DC component is compared with a predetermined reference potential at the comparator 84, and the comparison result is supplied as a correction signal 82 to the second reference voltage generating circuit 51.

The imaging output has the characteristic that a brighter photographic subject causes a lower DC component. Accordingly, if it is judged by the comparator 84 that the DC component of an image signal is the same as or lower than a particular potential, then the correction signal 82 with a higher voltage than that in ordinary cases is supplied to the second reference voltage generating circuit 51. Thus, the second reference voltage generating circuit 51 generates a reference voltage in a higher level than that of a first reference voltage generating circuit 50.

With this configuration, for example, when an image of a high-brightness photographic subject such as the sun, which is beyond the range of the ordinary assumption, is picked up in the pixel mixing mode, it is possible to apply, as the substrate voltage Vsub, a voltage that is higher than the high level substrate voltage Vsub applied during the ordinary read transfer periods. Accordingly, it is possible to image a bright photographic subject in the pixel mixing mode by reducing the charge signal amount, and thus excellent image characteristics can be obtained.

The switch circuit 13 selectively switches between a terminal 15 from which the shutter pulse SP is supplied and a terminal 16 from which the control pulse CON is supplied, and connects the terminal to a terminal 14 that is connected to the capacitor 12. Thus, via the capacitor 12, either one of the shutter pulse SP and the control pulse CON is superimposed on the reference voltage, and applied to the n-type substrate 70 as the substrate voltage Vsub.

Furthermore, this embodiment is characterized in that the photodiodes 1, vertical CCDs 2, an imaging region 3, a horizontal CCD 4, a charge detection portion 5, the output amplifier 6, the first reference voltage generating circuit 50, and the second reference voltage generating circuit 51 are provided on the same semiconductor substrate chip constituted by the n-type substrate 70. When the solid-state imaging element 7 and the second reference voltage generating circuit 51 are provided on the same semiconductor substrate chip 70, it is possible to make the imaging apparatus smaller and achieve electric power saving.

However, when the second reference voltage generating circuit 51 and the correction circuit 81 are placed on the same chip as the solid-state imaging element 7, if the characteristics such as dark current of the solid-state imaging element 7 vary due to the heat distribution of the semiconductor substrate chip based on heat generated by the second reference voltage generating circuit 51 or the correction circuit 81 for example, then the second reference voltage generating circuit 51 or the correction circuit 81, or both of them may be provided in external circuits. Even if the second reference voltage generating circuit 51 or the correction circuit 81, or both of them are provided in external circuits, according to this embodiment, it is possible to obtain an effect to reduce the charge signal amount by applying the substrate voltage Vsub that is higher than the high level substrate voltage Vsub applied during the ordinary read transfer periods.

Furthermore, the substrate voltage Vsub functions as the reference voltage for controlling the saturation charge amount in the photodiodes 1 as shown in FIG. 18.

The selection made by the switch circuit 13 is switched by a mode selecting signal Sm that is supplied in accordance with a selection made by a driving mode selecting portion (not shown). When the driving mode is the pixel mixing mode, the control pulse CON is superimposed on the reference voltage that is supplied by the first reference voltage generating circuit 50 and applied to the n-type substrate 70.

Figure 13:
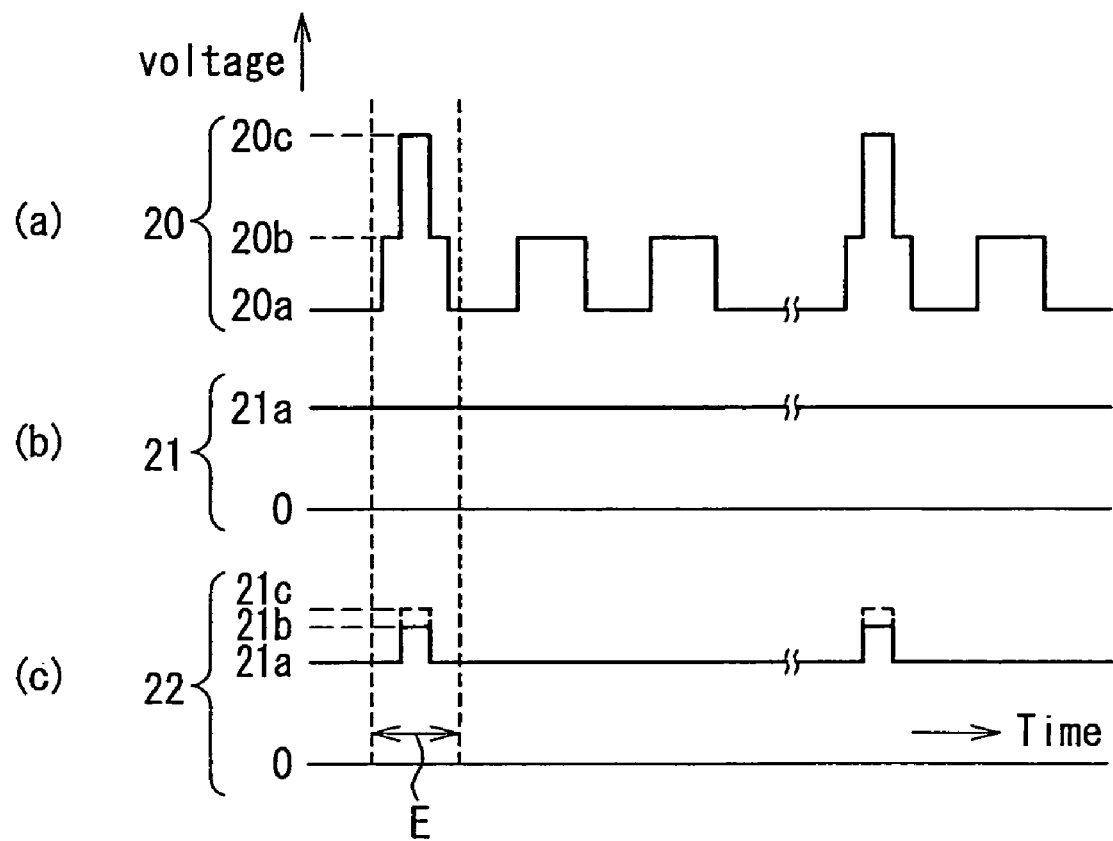
FIG. 13 is a waveform diagram showing pulse waveforms for driving the solid-state imaging apparatus.

FIG. 13 shows an example of the drive pulses in this embodiment. A clock pulse 20 shown in FIG. 13(a) is applied to an electrode 18 serving as a transfer electrode for the vertical CCD 2 and as an electrode for controlling read transfer of signal charges from the photodiode 1. Charges are transferred inside the vertical CCD 2 by applying voltages 20a and 20b in alternation. The period in which a voltage 20c is applied is the read transfer period.

FIG. 13(b) shows a substrate voltage 21 that is applied to the n-type substrate 70 in the full pixel mode. A voltage 21a corresponds to the reference voltage that is supplied from the first reference voltage generating circuit 50, and is constant throughout the charge accumulation periods and the read transfer periods. Herein, the shutter pulse SP that is supplied from the timing generating circuit 8 via the switch circuit 13 is not shown in the diagrams for the sake of simplicity. The voltage 21a corresponds to a threshold value for draining excess charges shown in FIG. 18, that is, a potential 26a that defines the saturation charge amount. More specifically, when the voltage 21a is applied to the n-type substrate 70, the potential barrier in a p-well region 17 is set to the potential 26a. In this manner, in the full pixel mode, the low potential 26a that is constant throughout the charge accumulation periods and the read transfer periods shown in FIG. 18 defines the saturation charge amount.

FIG. 13(c) shows a substrate voltage 22 that is applied to the n-type substrate 70 in the pixel mixing mode. A voltage 21b corresponds to the control pulse CON that is supplied from the timing generating circuit 8. More specifically, the substrate voltage 22 has the waveform obtained by superimposing the control pulse CON, whose voltage value is determined by a signal that is output from the second reference voltage generating circuit 51, on the reference voltage that is supplied from the first reference voltage generating circuit 50. The substrate voltage 22 serves as the high level voltage 21b in correspondence with the read transfer periods in the clock pulse 20, and serves as the low level voltage 21a during all other periods. The voltage 21b corresponds to a potential 26b that defines the saturation charge amount shown in FIG. 18.

In this manner, the saturation charge amount in the pixel mixing mode is set to be large during the charge accumulation periods and set to be small during the read transfer periods. Accordingly, it is possible to accumulate charges, utilizing the charge accumulating ability that is specific to the photodiode 1, without deteriorating the spectral characteristics, the sensitivity nor the linearity during the charge accumulation periods. Furthermore, it is possible to perform good driving for the pixel mixing mode by avoiding a limitation regarding a voltage that can be applied, by transferring charges in an amount reduced by draining excess charges during the read transfer periods.

The configuration above is the same as that of the first embodiment and the second embodiment. Furthermore, in this embodiment, an operation as below is performed by supplying a part of an image signal from the output amplifier 6 to the correction circuit 81.

The correction signal 82 is supplied from the correction circuit 81 to the second reference voltage generating circuit 51, for example, when the solid-state imaging element 7 picks up an image of a high-brightness photographic subject. More specifically, when the solid-state imaging element 7 picks up an image of a high-brightness photographic subject, the correction circuit 81 recognizes and determines that it is a high-brightness photographic subject, based on an image signal that is output from the output amplifier 6, and the correction signal 82 is output from the correction circuit 81. In order to enable the image of the high-brightness photographic subject to be picked up in the pixel mixing mode, the second reference voltage generating circuit 51 that has received the correction signal 82 outputs a voltage 21*c*, which is even higher than the voltage 21*b*. More specifically, in this embodiment, the voltage of the second reference voltage generating circuit 51 corresponds to the contrast of a photographic subject of the solid-state imaging element 7, and serves as an image signal that can be obtained from the output amplifier 6 in order to correspond to the contrast, for example, a potential 26*c* (see FIG. 18) that describes the saturation charge amount.

Thus, in this embodiment, the saturation charge amount becomes smaller in the pixel mixing mode, so that excellent image characteristics can be obtained when an image of a high-brightness photographic subject is picked up in the pixel mixing mode.

Figure 14:
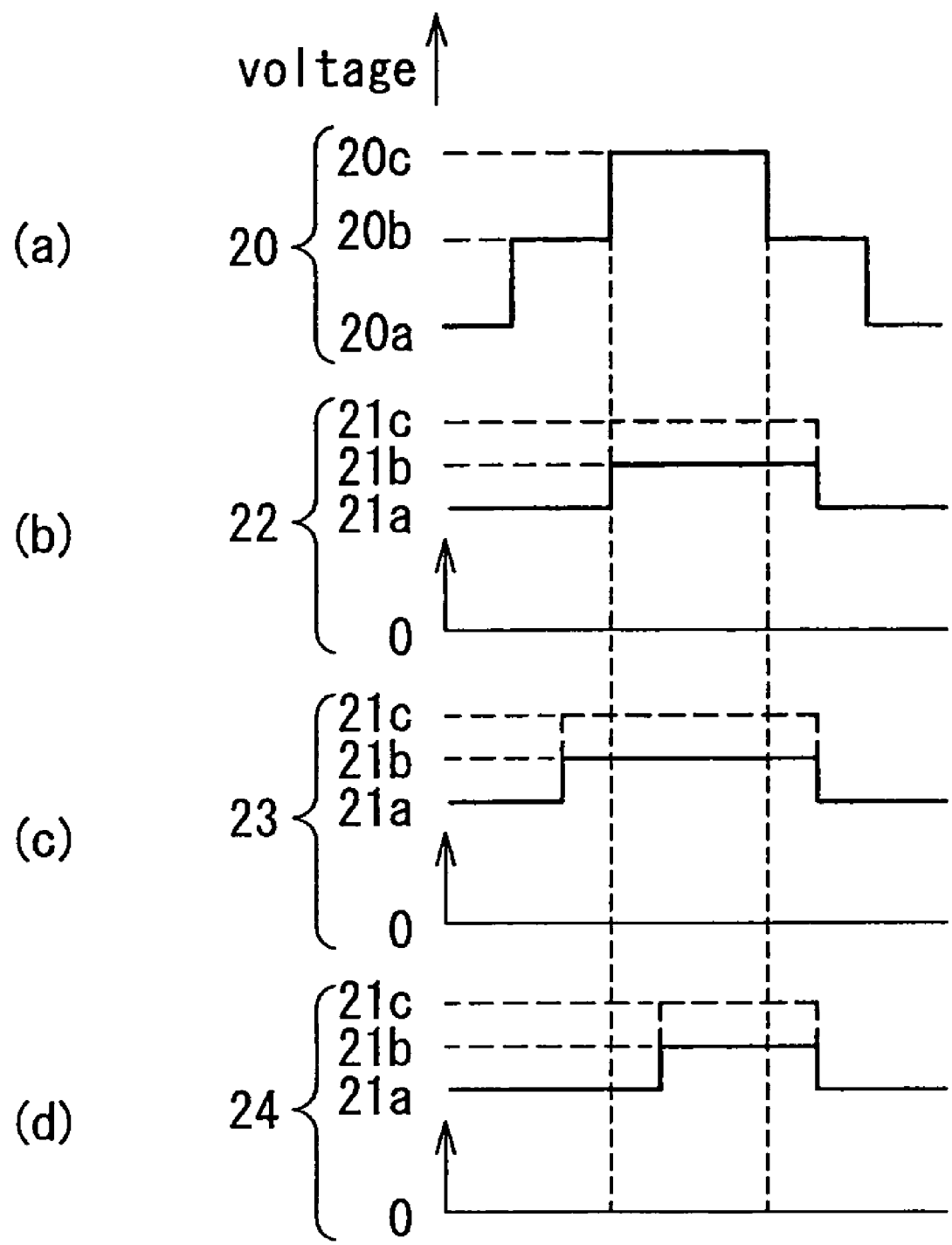
FIG. 14 is a waveform diagram showing in detail the pulse waveforms.

Next, the phase relationship between the clock pulse 20 in FIG. 13(*a*) and the high level voltage 21*b* in the substrate voltage 22 in FIG. 13(*c*) is described with reference to FIG. 14. FIGS. 14(*a*) and (*b*) schematically show enlarged views, in a period E, of the clock pulse 20 in FIG. 13(*a*) and the substrate voltage 22 in FIG. 13(*c*). Furthermore, FIGS. 14(*c*) and (*d*) show other examples of the substrate voltage 22.

The period of the voltage 21*b* in the substrate voltage 22 shown in FIG. 14(*b*) is overlapped with the period of the voltage 20*a* in the dock pulse 20 shown in FIG. 14(*a*). More specifically, the low level voltage 21*a* similar to that in conventional cases is applied during most of the signal charge accumulation periods, and the high level voltage 21*b* is applied during the transfer periods. Accordingly, charges that are shallower (lower) than the potential 26*b* for draining excess charges in FIG. 18 are not accumulated in the photodiode 1 but drained to the n-type substrate 70.

It is preferable that in the phase of the high level voltage 21*b*, the rising is at the same time as the rising of the voltage 20*c* in the clock pulse 20 in FIG. 14(*a*), that is, the start of the transfer period. However, the effect of draining excess charges is lowered slightly and the ability to control the signal amount is lowered. Furthermore, a slight delay as shown in a control pulse 24 in FIG. 14(*d*) is acceptable although the ability to control the signal amount is lowered. Furthermore, when the high level voltage 21*b* is applied to the n-type substrate 70 before the transfer period as shown in FIG. 14(*c*), signal charges that have been accumulated in the photodiode 1 are drained to the level of the potential 26*b* in FIG. 18, and thus the dynamic range of the photodiode 1 is lowered, but the ability to control the signal amount is improved.

It is possible that in the phase of the high level voltage 21*b* that is applied to the n-type substrate 70, the falling is at the same time as an end of the transfer period, but a slight delay as shown in FIG. 14(*b*) to (*d*) is better because the synchronous control becomes easy. Furthermore, if it is detected by the correction circuit 81 that an image of a high-brightness photographic subject has been picked up, then the low level voltage 21*a* and the voltage 21*c* in a higher level are applied as the substrate voltages 22 to 24 shown in FIG. 14(*b*) to (*d*).

Figure 15:
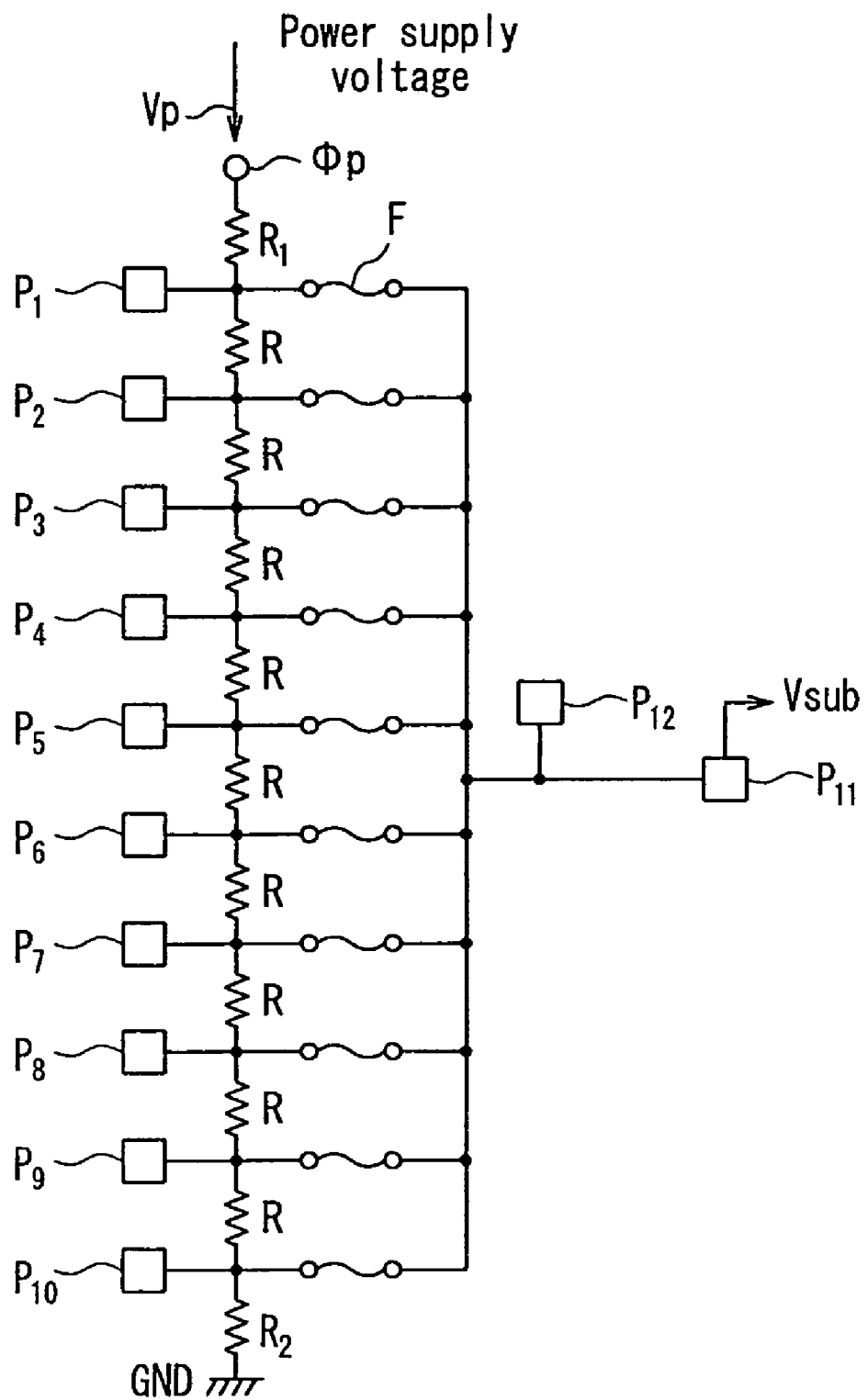
FIG. 15 is a circuit diagram showing one example of a first reference voltage generating circuit constituting the solid-state imaging apparatus.

The first reference voltage generating circuit 50 can be configured as the example shown in FIG. 15. The first reference voltage generating circuit 50 is the same as the first reference voltage generating circuit 50 used in the first embodiment shown in FIG. 4 and the second embodiment shown in FIG. 8.

Figure 16:
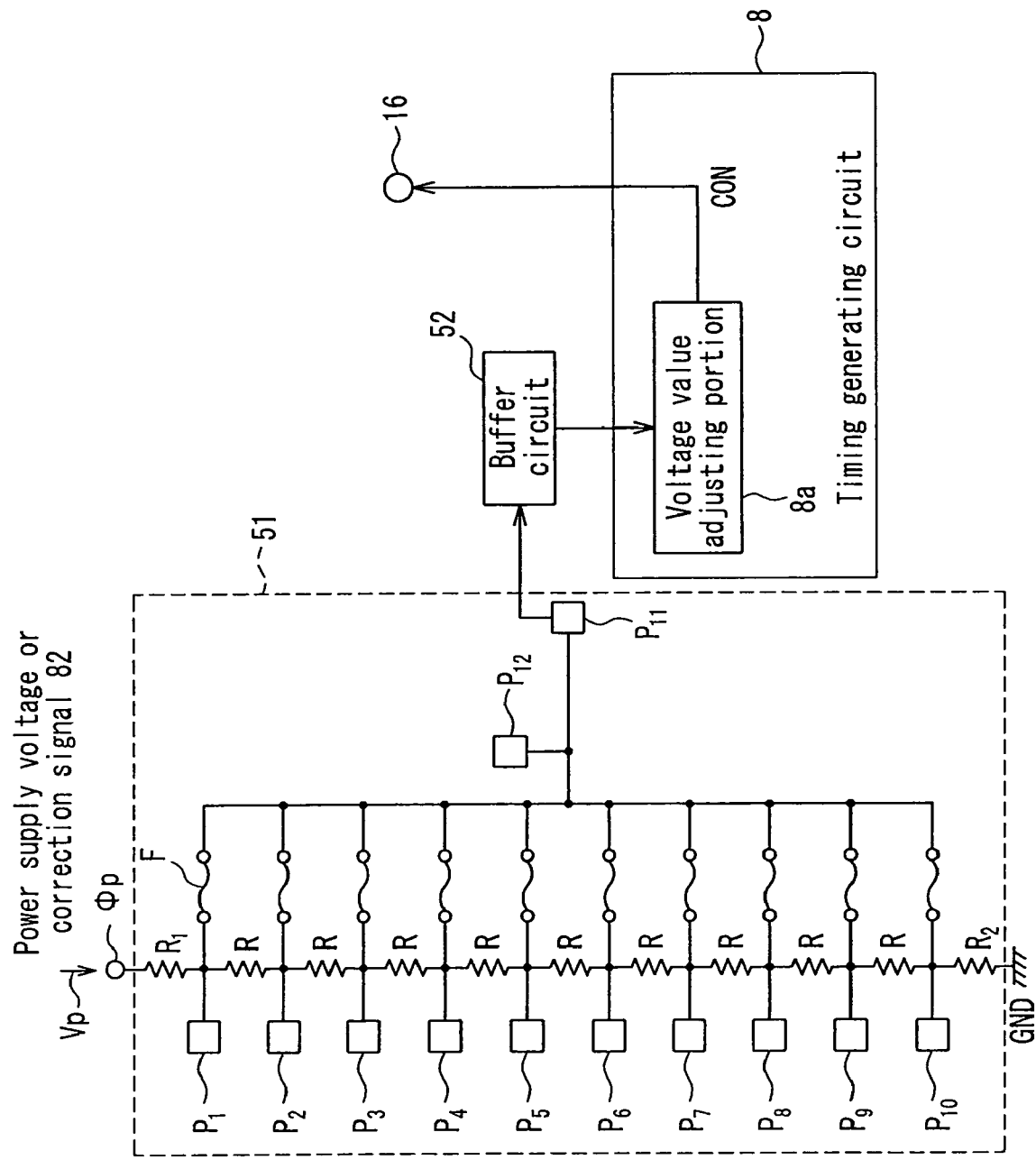
FIG. 16 is a diagram showing one example of a part of a second reference voltage generating circuit, a buffer circuit, and a timing generating circuit constituting the solid-state imaging apparatus.

The second reference voltage generating circuit 51, the buffer circuit 52, and the timing generating circuit 8 can be configured, for example, as in FIG. 16. It should be noted that the timing generating circuit 8 is shown partly with respect to the configuration for supplying a signal from the second reference voltage generating circuit 51 through the buffer circuit 52 to the terminal 16 as a control pulse.

In FIG. 16, the second reference voltage generating circuit 51 is provided with a resistance dividing circuit in which a plurality of resistors are connected in series between an input terminal φp and the ground (GND). The power supply voltage is supplied from the input terminal φp. Furthermore, if the correction signal 82 is received from the correction circuit 81, then the correction signal 82 instead of the power supply voltage is input to the input terminal φp of the second reference voltage generating circuit 51. Other configurations and circuit operations are the same as those in the second embodiment shown in FIG. 9. With this configuration, it is possible to secure the best dynamic range based on manufacturing differences between chips.

Figure 17:
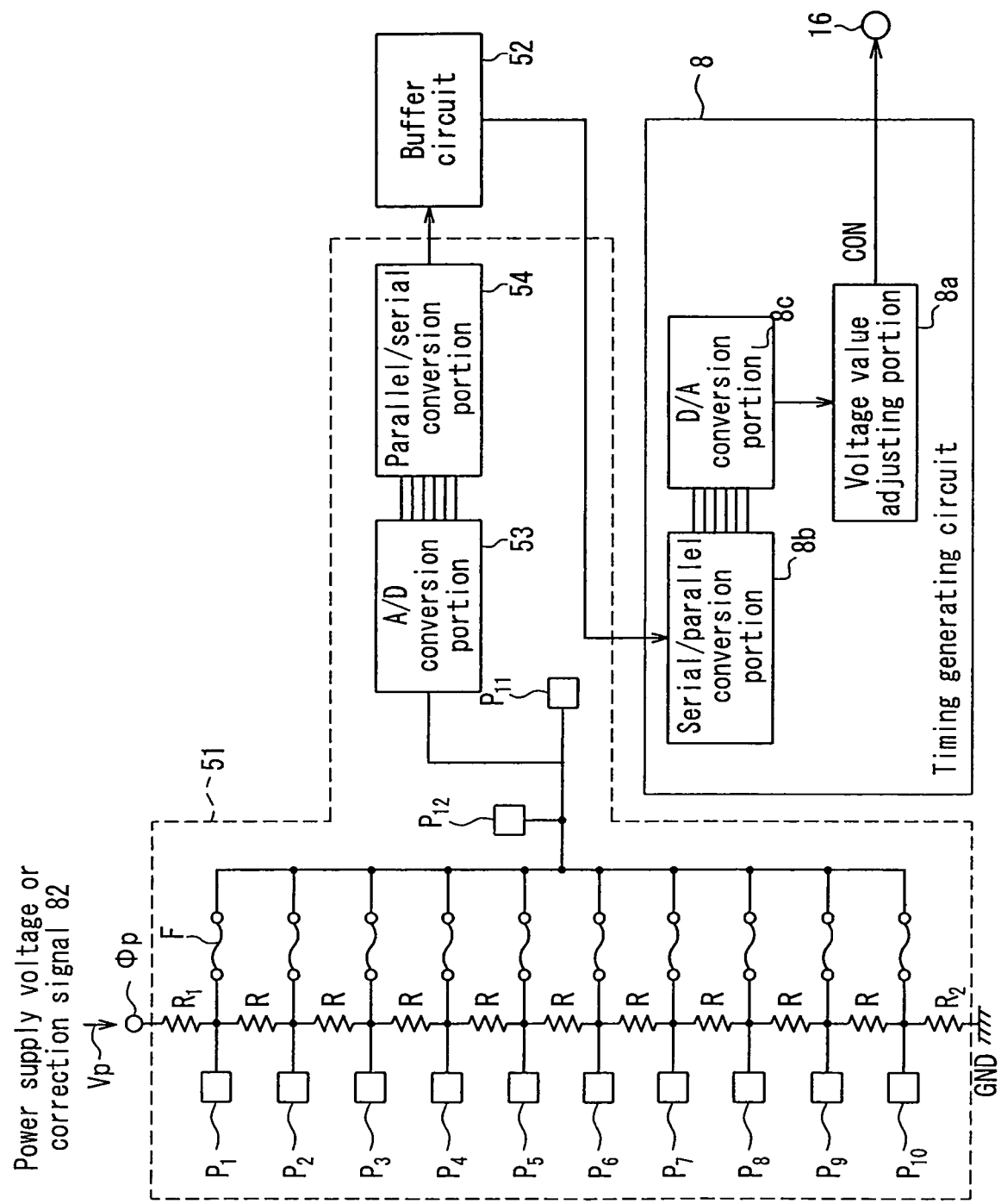
FIG. 17 is a diagram showing another example of a part of a second reference voltage generating circuit, a buffer circuit, and a timing generating circuit constituting the solid-state imaging apparatus.

Alternatively, as another configuration example, the second reference voltage generating circuit 51, the buffer circuit 52, and the timing generating circuit 8 can be configured as shown in FIG. 17. The timing generating circuit 8 is shown partly with respect to the configuration for supplying a signal from the second reference voltage generating circuit 51 through the buffer circuit 52 to the terminal 16 as a control pulse.

In FIG. 17, the second reference voltage generating circuit 51 is provided with a resistance dividing circuit in which a plurality of resistors are connected in series between an input terminal φp and the ground (GND). The power supply voltage is supplied from the input terminal φp. Furthermore, if the correction signal 82 is received from the correction circuit 81, then the correction signal 82 instead of the power supply voltage is input to the input terminal φp. Other configurations and circuit operations are the same as those in the second embodiment shown in FIG. 10.

Compared with the configuration shown in FIG. 17, the circuits in the configuration shown in FIG. 16 are simpler, and thus this configuration is advantageous in that it is easy to make the imaging apparatus smaller. On the other hand, compared with the configuration shown in FIG. 16, the configuration shown in FIG. 17 is advantageous in that it is possible to achieve the solid-state imaging apparatus having excellent noise tolerance because the reference voltage is converted into a digital signal.

Furthermore, in this embodiment, an example was shown in which the control pulse CON is generated at the timing generating circuit 8, but it is also possible that the control pulse CON is generated at a driver for supplying a CCD horizontal transfer pulse or vertical transfer pulse, or a signal processing portion 30 for processing a CCD output signal.

As described above, with the solid-state imaging apparatus and the driving method thereof according to the third embodiment of the present invention, if necessary, it is possible to apply the substrate voltage Vsub that is higher than the high level substrate voltage Vsub applied during the ordinary read transfer periods, and it is possible to mix a larger number of pixels in the mixed mode while securing the best dynamic range for each chip, by reducing the charge signal amount.

For example, an example was shown in which nine pixels are mixed in the first embodiment, whereas in this embodiment, it is possible to secure the dynamic range the same as or higher than that for nine-pixel mixing in the first embodiment even if 12 pixels, or 18 or more pixels are mixed. Furthermore, when the correction signal 82 is received from the correction circuit 81, the saturation charge amount in the pixel mixing mode becomes smaller, and thus excellent image characteristics can be obtained when an image of a high-brightness photographic subject is picked up in the pixel mixing mode.

In this manner, a large number of pixels can be mixed and excellent image characteristics can be obtained for a high-brightness photographic subject at the same time because of the following reasons.

First, the reason for this is that in this embodiment, it is possible to accumulate charges, utilizing the charge accumulating ability that is specific to the photodiode, without deteriorating the spectral characteristics, the sensitivity nor the linearity during the charge accumulation periods, and it is possible to perform good driving for the pixel mixing mode by avoiding a limitation regarding a voltage that can be applied, by transferring charges in an amount reduced by draining excess charges during the read transfer periods. Furthermore, it is possible to perform control properly when mixing signals of a plurality of pixels, by supplying a reference voltage that fits the signal amount of single pixel and the amount of signals of the plurality of pixels added, from each of the first and second reference voltage generating circuits 50 and 51. Furthermore, the reference voltage can be adjusted to an optimum voltage for various photodiode characteristics of each solid-state imaging element 7.

More specifically, it is possible to secure the linearity characteristics of the maximum while sufficiently draining charges that are more than necessary, and thus the highest dynamic range can be secured by preventing characteristics abnormalities in which when the substrate voltage Vsub is set using the signal amount of single pixel as a reference, the setting of the substrate voltage Vsub that is generated at the second reference voltage generating circuit 51 causes deterioration in the charge transfer when pixels are mixed and setting errors of the substrate voltage Vsub are accumulated.

The above effect is the same as that in the second embodiment, but in this embodiment, the second reference voltage generating circuit 51 and the correction circuit 81 can correct an optimized reference voltage in accordance with saturation characteristics of each solid-state imaging element 7 and supply it to the timing generating circuit 8. Thus, excellent image characteristics can be obtained when an image of a high-brightness photographic subject is picked up in the pixel mixing mode.

It should be noted that in conventional cases, reference voltage generating circuits have been provided on the same semiconductor substrate chip 70 only for the reference voltage as a DC voltage, with respect to the reference voltage that determines the substrate voltage, but the value of the reference voltage has been constant, and it has not been necessary for solid-state imaging apparatuses not provided with the pixel mixing mode to correct the reference voltage. Furthermore, it has not been assumed that the second reference voltage generating circuit 51 is provided on the same semiconductor substrate chip 70 on which the solid-state imaging element 7 is formed, and thus it has been impossible to supply the correction signal 82 as in this embodiment to the second reference voltage generating circuit 51.

However, according to this embodiment, the correction circuit 81 and the second reference voltage generating circuit 51 are provided on the same semiconductor substrate chip 70, and thus it is possible to correct the reference voltage Vsub during the read transfer periods in the pixel mixing mode, by obtaining the image signal 80 and the correction signal 82 as information for determining the reference voltage Vsub without using external units nor external circuits.

Furthermore, in this embodiment, the configuration is such that the correction signal 82 is supplied from the correction circuit 81, but it is also possible to use a configuration in which the correction signal 82 is supplied from the signal processing portion 30 by forming the signal processing portion 30 such as CDS or DSP on the same semiconductor substrate chip 70.

In this case, a signal that has been output from the output amplifier 6 is not divided for external units nor external circuits, and thus the load capacity is small for the output amplifier 6, so that it is possible to prevent the voltage or the frequency characteristics of the signal output from being lowered.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for driving a solid-state imaging apparatus that is provided with:

a plurality of photoelectric conversion portions for accumulating signal charges in accordance with an amount of incident light, a transfer portion for reading out signal charges that have been accumulated in the photoelectric conversion portions, and an excess charge draining portion for draining, from the photoelectric conversion portions, excess charges in an amount exceeding a saturation charge amount that is set by a reference voltage, the method comprising:

performing selectively one of a full pixel mode in which signal charges accumulated in the photoelectric conversion portions are detected individually for each pixel and a pixel mixing mode in which signal charges of a predetermined number of pixels are mixed to be detected;

supplying the excess charge draining portion, in the full pixel mode, with the reference voltage having the same value during a charge accumulation period for accumulating charges in the photoelectric conversion portions and a read transfer period for read transferring charges by the transfer portion; and supplying the excess charge draining portion, in the pixel mixing mode, with the reference voltage having a low level during the charge accumulation period and with the reference voltage having a high level higher than the low level during the read transfer period, wherein the reference voltage in the full pixel mode and the reference voltage having the low level in the pixel mixing mode are supplied from a first reference voltage generating circuit, the reference voltage having the high level in the pixel mixing mode is supplied by a combination of the first reference voltage generating circuit and a second reference voltage generating circuit, so as to have a waveform obtained by superimposing a control pulse that is supplied from a timing generating circuit upon receipt of a signal output from the second reference voltage generating circuit on a voltage that is supplied from the first reference voltage generating circuit, the second reference voltage generating circuit is provided with a resistance dividing circuit in which a plurality of resistors are connected in series between an input terminal and the ground, with the input terminal being supplied with a power supply voltage, and the first and the second reference voltage generating circuits are provided on a common semiconductor substrate chip on which the photoelectric conversion portions, the transfer portion and the excess charge draining portion are provided, with the timing generating circuit being separated from the common semiconductor substrate chip.

2. The method for driving the solid-state imaging apparatus according to claim 1, wherein a first or second high level voltage is applied as the reference voltage during the read transfer period.

3. The method for driving the solid-state imaging apparatus according to claim 2, wherein the first high level voltage has a waveform obtained by superimposing a control pulse that is supplied from a timing generating circuit upon receipt of a signal output from a second reference voltage generating circuit, on a first voltage supplied from a first reference voltage generating circuit, the second high level voltage has a waveform obtained by superimposing on the first voltage the control pulse that is output from the timing generating circuit in response to a correction signal that is output from the second reference voltage generating circuit based on an image signal of the solid-state imaging apparatus so as to correspond to a state of the solid-state imaging apparatus, and wherein the second high level voltage is a higher voltage than the first high level voltage.

4. The method for driving the solid-state imaging apparatus according to claim 2, wherein the second high level voltage is applied when an image of a high-brightness photographic subject is picked up in the pixel mixing mode.

5. The method for driving the solid-state imaging apparatus according to claim 2, wherein a third high level voltage or a fourth high level voltage is applied respectively as the first or second high level voltage during the read transfer period in the pixel mixing mode, the third high level voltage is selected in a monitor mode, the fourth high level voltage is selected in a moving image mode, and the fourth high level voltage is a higher voltage than the third high level voltage.

6. The method for driving the solid-state imaging apparatus according to claim 1, wherein a third high level voltage or a fourth high level voltage is applied as the high level voltage during the read transfer period in the pixel mixing mode, the third high level voltage is selected in a monitor mode, the fourth high level voltage is selected in a moving image mode, and the fourth high level voltage is a higher voltage than the third high level voltage.

7. The method for driving the solid-state imaging apparatus according to claim 1, wherein the high level voltage is set to have a phase in which a rising thereof is at the same time as or delayed from a start of the read transfer period in the pixel mixing mode.

8. The method for driving the solid-state imaging apparatus according to claim 1, wherein the high level voltage is set to have a phase in which a falling thereof is at the same time as or delayed from an end of the read transfer period in the pixel mixing mode.

9. A solid-state imaging apparatus, comprising a plurality of photoelectric conversion portions for accumulating signal charges in accordance with an mount of incident light, a transfer portion for reading out signal charges that have been accumulated in the photoelectric conversion portions, an excess charge draining portion for draining, from the photoelectric conversion portions, excess charges in an amount exceeding a saturation charge amount that is set by a reference voltage, a first reference voltage generating circuit for supplying the reference voltage to the excess charge draining portion, a second reference voltage generating circuit for outputting the reference voltage that is to be supplied to the excess charge draining portion, a timing generating circuit for supplying a control pulse upon receipt of a signal that is output from the second reference voltage generating circuit, and a switch circuit for switching between the control pulse and a shutter pulse to supply the selected pulse to the excess charge draining portion, wherein the control pulse is selected in a pixel mixing mode in which signal charges of a predetermined number of pixels are mixed to be detected, wherein the reference voltage in a full pixel mode and the reference voltage having a low level in the pixel mixing mode are supplied from the first reference voltage generating circuit, the reference voltage having a high level in the pixel mixing mode is supplied by a combination of the first reference voltage generating circuit and the second reference voltage generating circuit, so as to have a waveform obtained by superimposing the control pulse that is supplied from the timing generating circuit upon receipt of a signal output from the second reference voltage generating circuit on a voltage that is supplied from the first reference voltage generating circuit, the second reference voltage generating circuit is provided with a resistance dividing circuit in which a plurality of resistors are connected in series between an input terminal and a ground, the input terminal being supplied with a power supply voltage, and the first and the second reference voltage generating circuits are provided on a common semiconductor substrate chip on which the photoelectric conversion portions, the transfer portion and the excess charge draining portion are provided, with the timing generating circuit being separated from the common semiconductor substrate chip.

10. The solid-state imaging apparatus according to claim 9, further comprising a buffer circuit between the second reference voltage supply portion and the timing generating circuit.

11. The solid-state imaging apparatus according to claim 10, further comprising an A/D conversion portion and a parallel/serial conversion portion between the second reference voltage supply portion and the buffer circuit, wherein an A/D conversion and a parallel/serial conversion are performed on a signal that is output from the second reference voltage supply portion, and a serial/parallel conversion and a D/A conversion are performed at the timing generating circuit on a signal that is output from the buffer circuit.

12. The solid-state imaging apparatus according to claim 9, further comprising a correction circuit for supplying a correction signal to the second reference voltage supply portion, wherein the correction circuit generates the correction signal based on a pixel signal read out from the photoelectric conversion portions.

13. The solid-state imaging apparatus according to claim 9, wherein the excess charge draining portion is a semiconductor substrate that is provided with the photoelectric conversion portions and the transfer portion.

* * * * *